US012456474B2

(12) United States Patent
Gozzi et al.

(10) Patent No.: US 12,456,474 B2
(45) Date of Patent: Oct. 28, 2025

(54) ADVANCED NOISE CANCELLATION

(71) Applicant: COCHLEAR LIMITED, Macquarie University (AU)

(72) Inventors: Alberto Gozzi, Macquarie University (AU); Thomas Leroux, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 275 days.

(21) Appl. No.: 18/026,029

(22) PCT Filed: Sep. 10, 2021

(86) PCT No.: PCT/IB2021/058270
§ 371 (c)(1),
(2) Date: Mar. 13, 2023

(87) PCT Pub. No.: WO2022/054008
PCT Pub. Date: Mar. 17, 2022

(65) Prior Publication Data

US 2023/0368806 A1 Nov. 16, 2023

Related U.S. Application Data

(60) Provisional application No. 63/077,194, filed on Sep. 11, 2020.

(51) Int. Cl.
*G10L 21/0216* (2013.01)
*H04R 25/00* (2006.01)

(52) U.S. Cl.
CPC ........ *G10L 21/0216* (2013.01); *H04R 25/407* (2013.01); *G10L 2021/02165* (2013.01); *H04R 2410/05* (2013.01); *H04R 2460/01* (2013.01)

(58) Field of Classification Search
CPC ....... G10L 2021/02165; G10L 21/0208; G10L 21/0216; G10L 2021/02082; G10L 15/20;
(Continued)

(56) References Cited

U.S. PATENT DOCUMENTS 6,240,192 B1 * 5/2001 Brennan ............. H04R 25/505 381/314
6,480,610 B1 * 11/2002 Fang .................... H04R 25/453 381/318
(Continued)

FOREIGN PATENT DOCUMENTS

KR 20170062362 A 6/2017

OTHER PUBLICATIONS

International Search Report and Written Opinion for PCT/IB2021/058270, mailed Dec. 14, 2021.

*Primary Examiner* — Vijay B Chawan
(74) *Attorney, Agent, or Firm* — Pilloff Passino & Cosenza LLP; Martin J. Cosenza

(57) ABSTRACT

A system for reducing noise in a drive signal of a hearing device, including a microphone operative to receive sound and generate a microphone output signal and an adaptive filter apparatus that receives a signal from a transducer separate from the microphone and outputs a filtered signal, wherein the system subtracts the outputted filtered signal from a signal based on the microphone output signal to cancel noise and outputs the resulting signal, and the system further processes the resulting signal to obtain a further processed resulting signal to remove and/or eliminate residual feedback present in the resulting signal.

22 Claims, 15 Drawing Sheets

(58) Field of Classification Search
CPC ........... G10L 2021/02087; G10L 21/02; G10L 21/0232; G10L 21/0364; G10L 25/18
USPC .......................................................... 704/226
See application file for complete search history.

(56) References Cited

U.S. PATENT DOCUMENTS 6,754,358 B1 * 6/2004 Boesen ............... H04M 1/6066 381/328
6,807,445 B2 10/2004 Baumann et al.
7,354,394 B2 4/2008 Slattery, III et al.
7,522,738 B2 4/2009 Miller, III
7,775,964 B2 8/2010 Miller, III
8,130,991 B2 * 3/2012 Rasmussen .......... H04R 25/453 381/317
8,189,833 B2 * 5/2012 Klinkby ............... H04R 25/453 381/313
8,437,487 B2 * 5/2013 Munk .................. H04R 25/453 381/317
8,553,901 B2 10/2013 Hersbach
8,588,444 B2 * 11/2013 Pape .................... H04R 25/453 381/313
8,641,595 B2 2/2014 Basinger
8,771,166 B2 7/2014 Conn et al.
8,840,540 B2 * 9/2014 Miller, III ............ H04R 25/453 600/25
9,672,804 B2 * 6/2017 Dave ................ G10K 11/17885
9,716,952 B2 7/2017 Mauger
10,257,619 B2 * 4/2019 Vanpoucke .......... H04R 25/453
10,492,008 B2 * 11/2019 Xu ....................... H04R 25/552
10,525,265 B2 * 1/2020 Hubert-Brierre ............................ A61N 1/36036
10,798,494 B2 * 10/2020 Kamkar-Parsi ...... H04R 25/554
10,839,786 B1 * 11/2020 Hera ........................ H04R 5/04
11,330,358 B2 * 5/2022 Ganeshkumar .. G10K 11/17873
11,638,102 B1 * 4/2023 LeRoux ................. H04R 25/30 600/25
12,177,614 B2 * 12/2024 LeRoux ............... H04R 25/305
2009/0028367 A1 * 1/2009 Klinkby ............... H04R 25/453 381/318
2010/0232632 A1 * 9/2010 Kindred ............ H04M 1/72478 381/318
2011/0188686 A1 * 8/2011 Munk .................. H04R 25/453 381/318
2011/0319703 A1 12/2011 Wiskerke et al.
2015/0180536 A1 * 6/2015 Zhang ................. G10L 21/0364 381/66
2015/0367132 A1 12/2015 Milczynski et al.
2016/0165362 A1 * 6/2016 Hubert-Brierre ............................ A61N 1/36036 381/320
2016/0345107 A1 * 11/2016 Van Dijk ............. H04R 25/505
2018/0317027 A1 11/2018 Bolner et al.
2020/0213781 A1 7/2020 Case et al.
2022/0060812 A1 * 2/2022 Ganeshkumar .. G10K 11/17815
2023/0368806 A1 * 11/2023 Gozzi ................. G10L 21/0208

* cited by examiner

ADVANCED NOISE CANCELLATION

CROSS-REFERENCE TO RELATED APPLICATIONS

This application claims priority to U.S. Provisional Application No. 63/077,194, entitled ADVANCED NOISE CANCELLATION, filed on Sep. 11, 2020, naming Alberto GOZZI of Mechelen, Belgium as an inventor, the entire contents of that application being incorporated herein by reference in its entirety.

BACKGROUND

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In accordance with an exemplary embodiment, there is a system for reducing noise in a drive signal of a hearing device, comprising a microphone operative to receive sound and generate a microphone output signal and an adaptive filter apparatus that receives a signal from a transducer separate from the microphone and outputs a filtered signal, wherein the system subtracts the outputted filtered signal from a signal based on the microphone output signal to cancel noise and outputs the resulting signal, and the system further processes the resulting signal to obtain a further processed resulting signal to remove and/or eliminate residual feedback present in the resulting signal.

In accordance with another exemplary embodiment, there is a system for reducing noise in a drive signal of a hearing device, comprising a microphone operative to receive sound and generate a microphone output signal and an accelerometer operative to receive energy and generate an accelerometer output signal, the energy being energy also received at least in part by the microphone and transduced at least in part by the microphone into the microphone output signal, wherein the system is configured to cancel feedback from the microphone output signal and the accelerometer output signal and output respective cleaner signals, and the system is configured to combine the respective signals to a modified signal that is a result of subtraction of a signal based on the respective cleaner signal for the accelerometer from a signal based on the respective cleaner signal for the microphone.

In another exemplary embodiment, there is a method, comprising capturing ambient sound with an implanted microphone and evoking a hearing percept based on the captured ambient sound utilizing an implanted actuator, first processing a signal based on the captured ambient sound to obtain a first processed signal, wherein the first processing eliminates at least a portion of feedback content in the signal, and processing the first processed signal to obtain a second processed signal, wherein the second processing eliminates residual feedback or body noise from the second signal, and wherein the implanted actuator is actuated based on a signal based on the second processed signal to evoke the hearing percept.

BRIEF DESCRIPTION OF THE DRAWINGS

Embodiments of the present invention are described below with reference to the attached drawings, in which:

FIGS. 1D-2 present exemplary devices in which embodiments of the teachings herein can be implemented;

DETAILED DESCRIPTION

Figure 1:
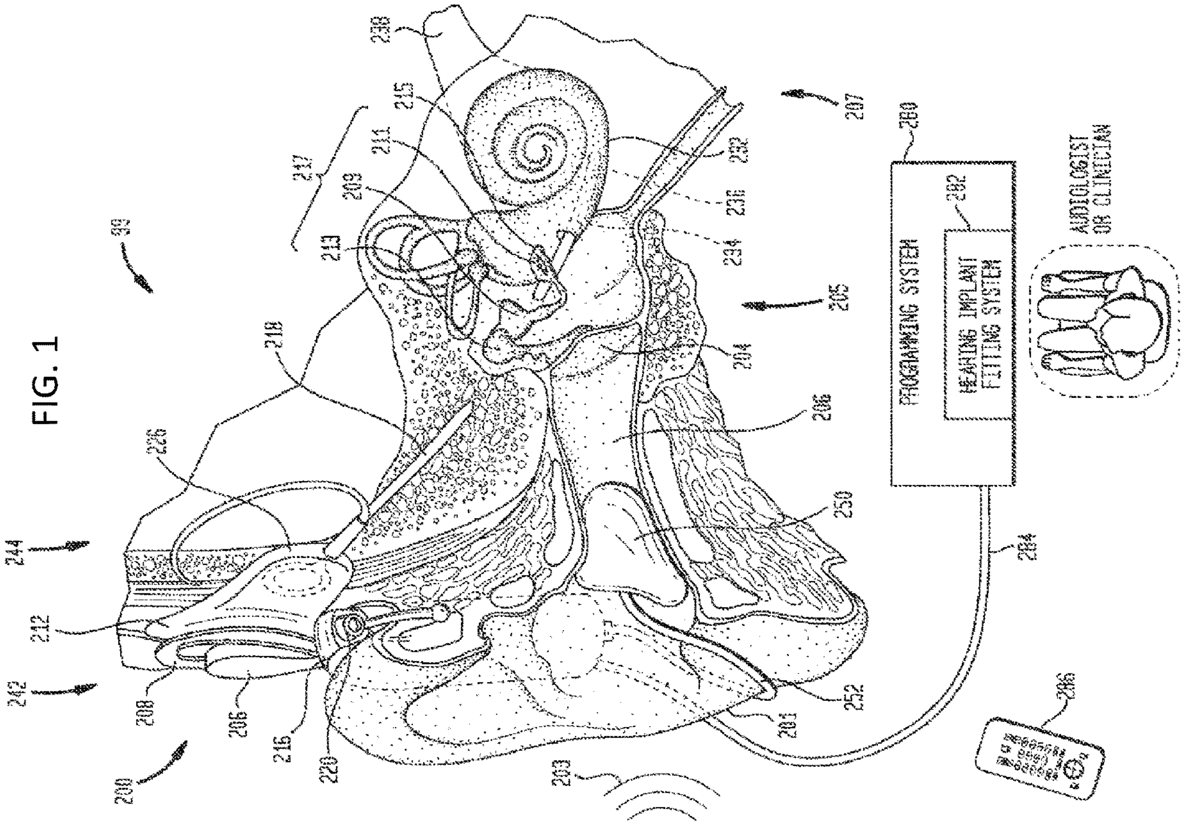
FIG. 1 is a perspective view of an exemplary hearing prosthesis in which at least some of the teachings detailed herein are applicable.

Merely for ease of description, the techniques presented herein are primarily described herein with reference to an illustrative medical device, namely a bimodal hearing prosthesis that includes a cochlear implant and an acoustic hearing aid (a multimode hearing prosthesis). However, it is to be appreciated that the techniques presented herein may also be used with a variety of other medical devices that, while providing a wide range of therapeutic benefits to recipients, patients, or other users, may benefit from the teachings herein used in other medical devices. For example, any techniques presented herein described for one type of hearing prosthesis, such as a cochlear implant and/or an acoustic hearing aid, corresponds to a disclosure of another embodiment of using such teaching with another hearing prostheses, including bone conduction devices (percutaneous, active transcutaneous and/or passive transcutaneous), middle ear auditory prostheses, direct acoustic stimulators, and also utilizing such with other electrically simulating auditory prostheses (e.g., auditory brain stimulators), etc. The techniques presented herein can be used with implantable/implanted microphones, whether or not used as part of a hearing prosthesis (e.g., a body noise or other monitor, whether or not it is part of a hearing prosthesis) and/or external microphones. The techniques presented herein can also be used with vestibular devices (e.g., vestibular implants), sensors, seizure devices (e.g., devices for monitoring and/or treating epileptic events, where applicable), sleep apnea devices, electroporation, etc., and thus any disclosure herein is a disclosure of utilizing such devices with the teachings herein, providing that the art enables such. The teachings herein can also be used with conventional hearing devices, such as telephones and ear bud devices connected MP3 players or smart phones or other types of devices that can provide audio signal output. Indeed, the teachings herein can be used with specialized communication devices, such as military communication devices, factory floor communication devices, professional sports communication devices, etc.

By way of example, any of the technologies detailed herein which are associated with components that are implanted in a recipient can be combined with information delivery technologies disclosed herein, such as for example, devices that evoke a hearing percept, to convey information to the recipient. By way of example only and not by way of limitation, a sleep apnea implanted device can be combined with a device that can evoke a hearing percept so as to provide information to a recipient, such as status information, etc. In this regard, the various sensors detailed herein and the various output devices detailed herein can be combined with such a non-sensory prosthesis or any other nonsensory prosthesis that includes implantable components so as to enable a user interface as will be described herein that enables information to be conveyed to the recipient, which information is associated with the implant.

While the teachings detailed herein will be described for the most part with respect to hearing prostheses, in keeping with the above, it is noted that any disclosure herein with respect to a hearing prosthesis corresponds to a disclosure of another embodiment of utilizing the associated teachings with respect to any of the other prostheses noted herein, whether a species of a hearing prosthesis, or a species of a sensory prosthesis.

FIG. 1 is a perspective view of an exemplary multimodal prosthesis. The ear 99 includes outer ear 201, middle ear 205, and inner ear 207 are described next below, followed by a description of an implanted multimodal system 200. Multimodal system 200 provides multiple types of stimulation, i.e., acoustic, electrical, and/or mechanical. These different stimulation modes may be applied ipsilaterally or contralaterally. In the embodiment shown in FIG. 1, multimodal implant 200 provides acoustic and electrical stimulation, although other combinations of modes can be implemented in some embodiments. By way of example and not by way of limitation, a middle-ear implant can be utilized in combination with the cochlear implant, a bone conduction device can be utilized in combination with the cochlear implant, etc.

In a person with normal hearing or a recipient with residual hearing, an acoustic pressure or sound wave 203 is collected by outer ear 201 (that is, the auricle) and channeled into and through ear canal 206. Disposed across the distal end of ear canal 206 is a tympanic membrane 204 which vibrates in response to acoustic wave 203. This vibration is coupled to oval window, fenestra ovalis 215 through three bones of middle ear 205, collectively referred to as the ossicles 217 and comprising the malleus 213, the incus 209, and the stapes 211. Bones 213, 209, and 211 of middle ear 205 serve to filter and transfer acoustic wave 203, causing oval window 215 to articulate, or vibrate. Such vibration sets up waves of fluid motion within cochlea 232. Such fluid motion, in turn, activates tiny hair cells (not shown) that line the inside of cochlea 232. Activation of the hair cells causes appropriate nerve impulses to be transferred through the spiral ganglion cells (not shown) and auditory nerve 238 to the brain (not shown), where such pulses are perceived as sound.

Figure 1A:
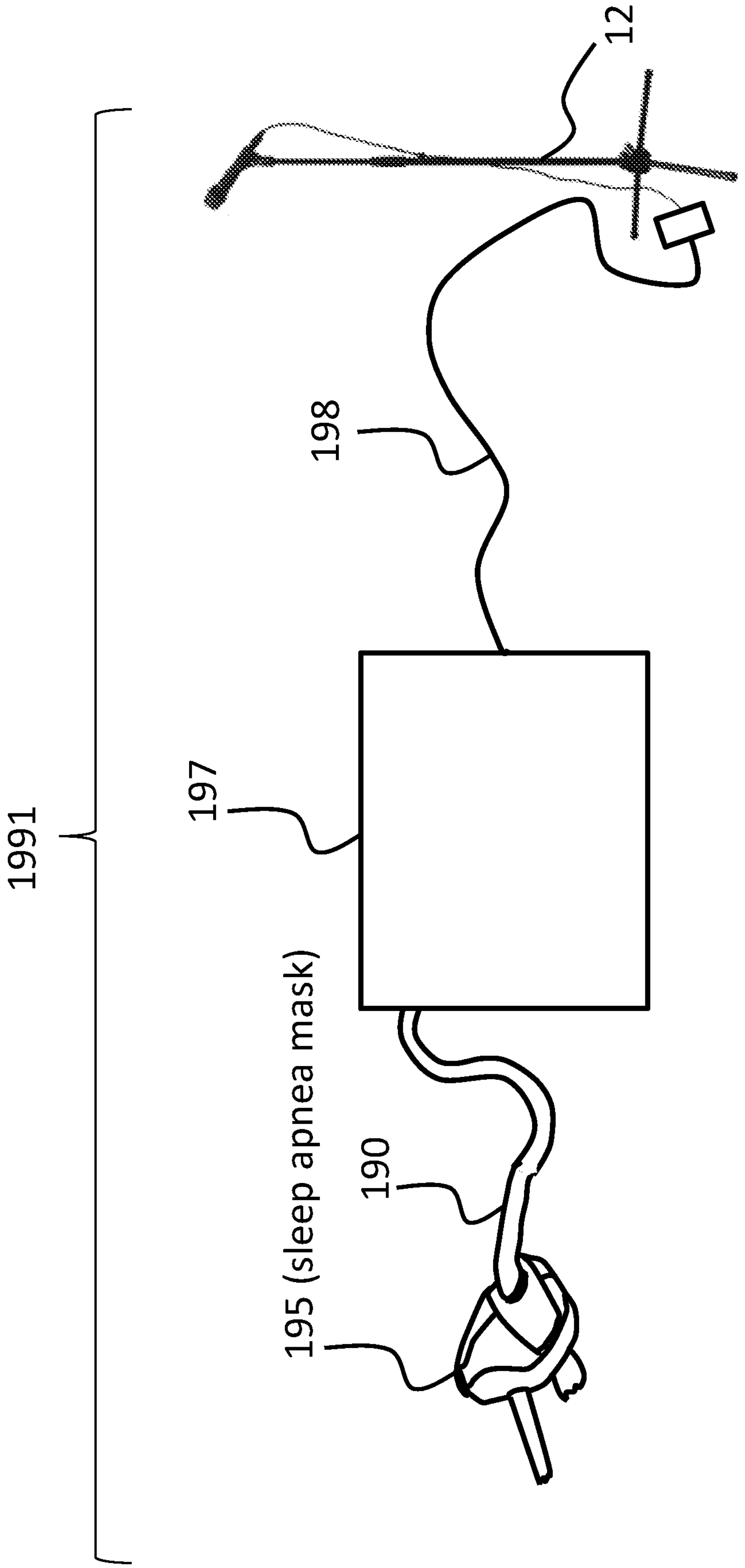
FIGS. 1A-C are views of exemplary sleep apnea medical devices in which at least some of the teachings detailed herein are applicable.

FIG. 1A provides a schematic of an exemplary conceptual sleep apnea system 1991. Here, this exemplary sleep apnea system utilizes a microphone 12 (represented conceptually) to capture a person's breathing or otherwise the sounds made by a person while sleeping. The microphone transduces the captured sound into an electrical signal which is provided via electrical leads 198 to the main unit 197, which includes a processor unit that can evaluate the signal from leads 198 or, in another embodiment, unit 197 is configured to provide that signal to a remote processing location via the Internet of the like, where the signal was evaluated. Upon an evaluation that an action should be taken or otherwise can be utilitarian taken by the sleep apnea system 1991, the unit 197 activates to implement sleep apnea countermeasures, which countermeasures are conducted by a hose 1902 sleep apnea mask 195. By way of example only and not by way of limitation, pressure variations can be used to treat the sleep apnea upon an indication of such an occurrence.

Figure 1B:
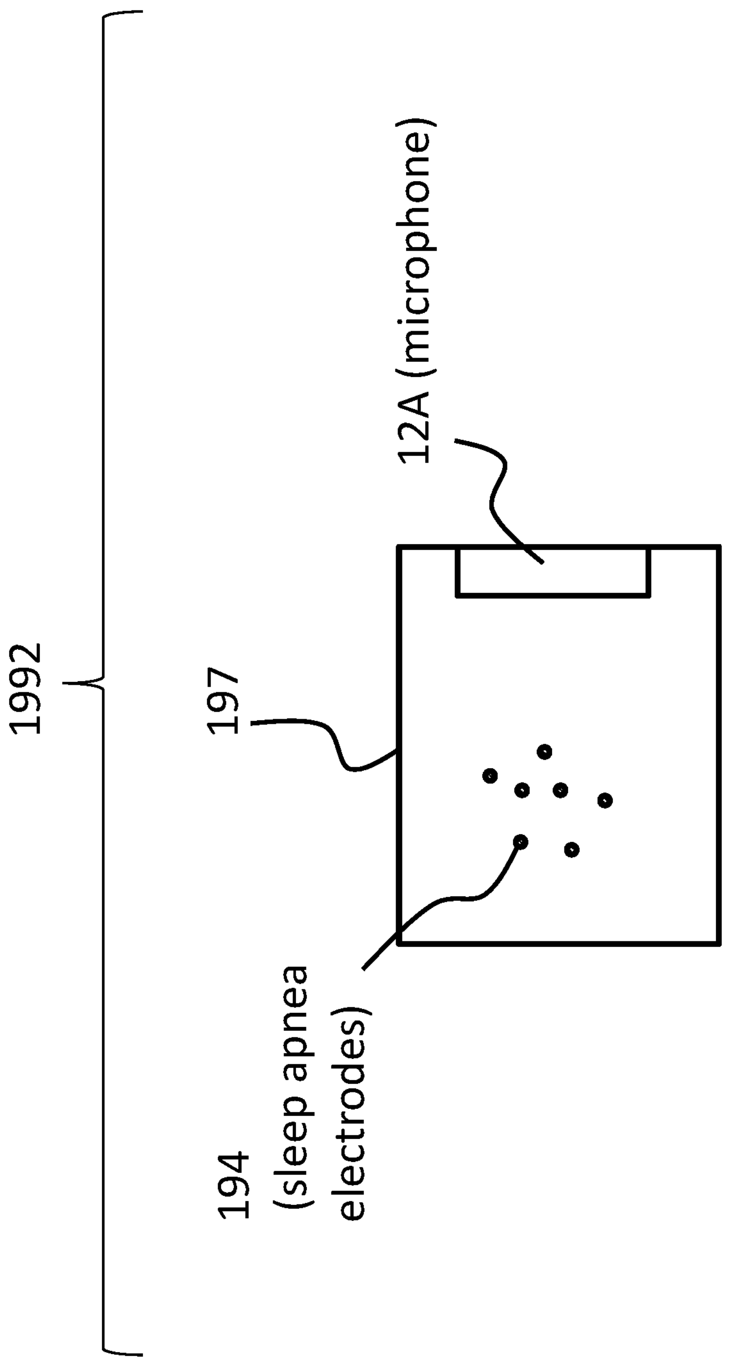
Figure 1C:
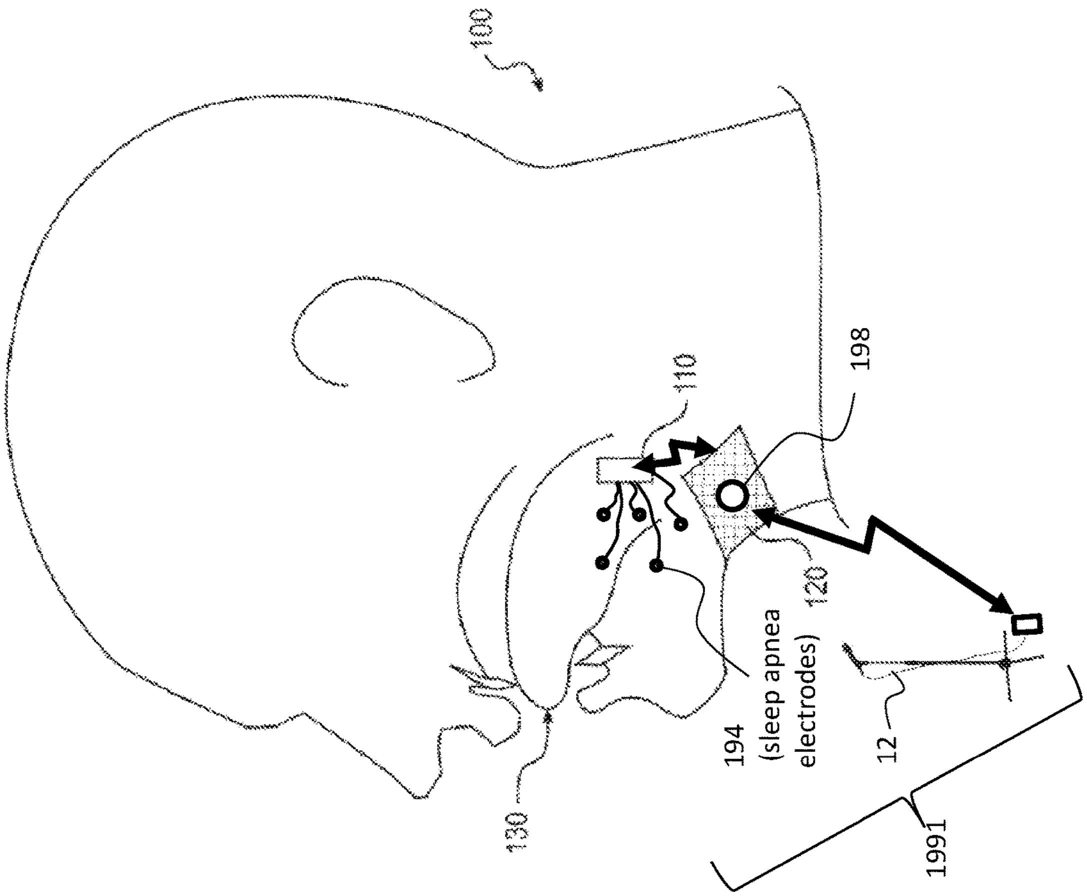

FIGS. 1B and 1C provide another exemplary schematic of another exemplary conceptual sleep apnea system 1992. Here, the sleep apnea system is different from that of FIG. 1A in that electrodes 194 (which can be implanted in some embodiments) are utilized to provide stimulation to the human who is experiencing a sleep apnea scenario. FIG. 1B illustrates an external unit, and FIG. 1C illustrates the external unit 120 and an implanted unit 110 in signal communication via an inductance coil 707 of the external unit and a corresponding implanted inductance coil (not shown) of the implanted unit, according to which the teachings herein can be applicable. Implanted unit 110, can be configured for implantation in a recipient, in a location that permits it to modulate nerves of the recipient 100 via electrodes 194. In treating sleep apnea, implant unit 110 and/or the electrodes thereof can be located on a genioglossus muscle of a patient. Such a location is suitable for modulation of the hypoglossal nerve, branches of which run inside the genioglossus muscle.

External unit 120 can be configured for location external to a patient, either directly contacting, or close to the skin of the recipient. External unit 120 may be configured to be affixed to the patient, for example, by adhering to the skin of the patient, or through a band or other device configured to hold external unit 120 in place. Adherence to the skin of external unit 120 may occur such that it is in the vicinity of the location of implant unit 110 so that, for example, the external unit 120 can be in signal communication with the implant unit 110 as conceptually shown, which communication can be via an inductive link or an RF link or any link that can enable treatment of sleep apnea using the implant unit and the external unit. External unit can include a processor unit 198 that is configured to control the stimulation executed by the implant unit 110. In this regard, processor unit 198 can be in signal communication with microphone 12, via electrical leads, such as in an embodiment where the external unit 120 8 is a modularized component, or via a wireless system, such as conceptually represented in FIG. 1C.

A common feature of both of these sleep apnea treatment systems is the utilization of the microphone to capture sound, and the utilization of that captured sound to implement one or more features of the sleep apnea system. In some embodiments, the teachings herein are used with the sleep apnea device just detailed.

Figure 1D:
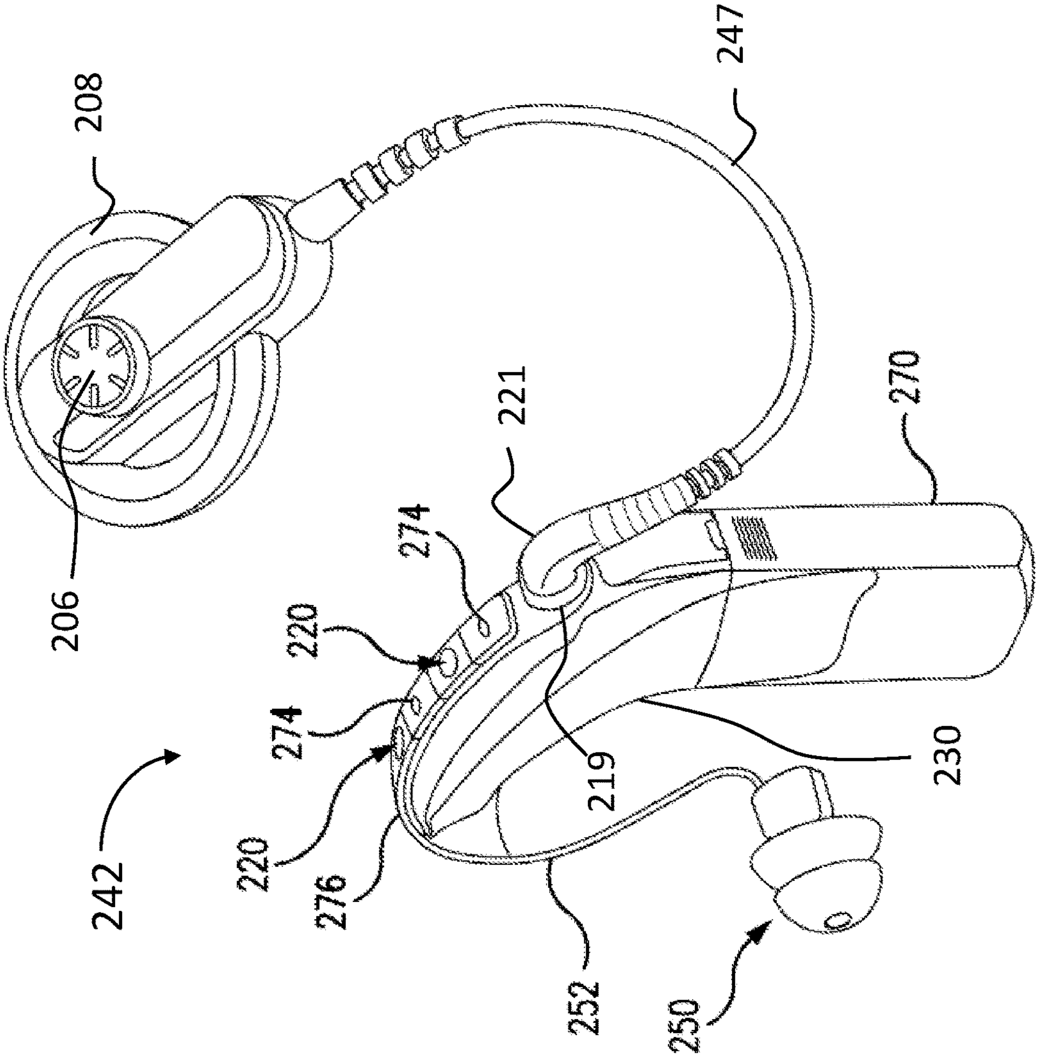

Returning back to hearing prostheses devices, in individuals with a hearing deficiency who may have some residual hearing, an implant or hearing instrument may improve that individual's ability to perceive sound. Multimodal prosthesis 200 may comprises external component assembly 242 which is directly or indirectly attached to the body of the recipient, and an internal component assembly 244 which is temporarily or permanently implanted in the recipient. External component assembly is also shown in FIG. 1D. In embodiments of the present invention, components in the external assembly 242 may be included as part of the implanted assembly 244, and vice versa. Also, embodiments of the present invention may be used with implanted multimodal system 200 which are fully implanted. Embodiments of the teachings herein include utilizing such in the device of FIG. 1D or FIG. 2 detailed below.

External assembly 242 typically comprises a sound transducer 220 for detecting sound, and for generating an electrical audio signal, typically an analog audio signal. In this illustrative embodiment, sound transducer 220 is a microphone. In alternative embodiments, sound transducer 220 can be any device now or later developed that can detect sound and generate electrical signals representative of such sound. An exemplary alternate location of sound transducer 220 will be detailed below.

Figure 1E:
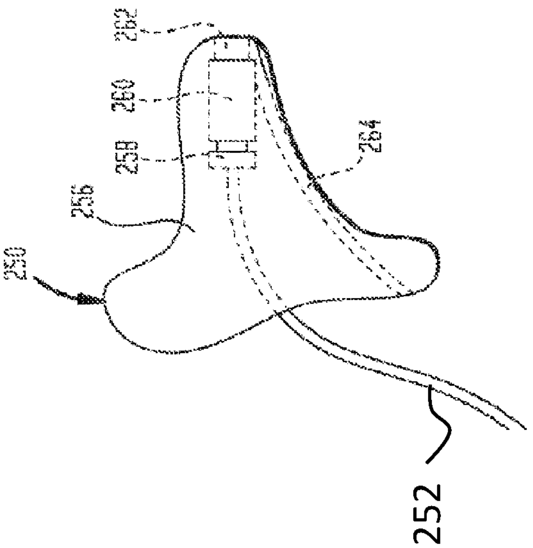

External assembly 242 also comprises a signal processing unit, a power source (not shown), and an external transmitter unit. External transmitter unit 206 comprises an external coil 208 and, preferably, a magnet (not shown) secured directly or indirectly to the external coil 208. Signal processing unit processes the output of microphone 220 that is positioned, in the depicted embodiment, by outer ear 201 of the recipient. Signal processing unit generates coded signals using a signal processing apparatus (sometimes referred to herein as a sound processing apparatus), which can be circuitry (often a chip) configured to process received signals—because element 230 contains this circuitry, the entire component 230 is often called a sound processing unit or a signal processing unit. These coded signals can be referred to herein as a stimulation data signals, which are provided to external transmitter unit 206 via a cable 247 and to the receiver in the ear 250 via cable 252. In this exemplary embodiment of FIG. 1D, cable 247 includes connector jack 221 which is bayonet fitted into receptacle 219 of the signal processing unit 230 (an opening is present in the dorsal spine, which receives the bayonet connector, in which includes electrical contacts to place the external transmitter unit into signal communication with the signal processor 230). Is also noted that in alternative embodiments, the external transmitter unit 26 is hardwired the signal processor subassembly 230. That is, cable 247 is in signal communication via hardwiring, with the signal processor subassembly. (The device of course could be disassembled, but that is different than the arrangement shown in FIG. 1D that utilizes the bayonet connector.) FIG. 1E provides additional details of an exemplary receiver 250. The overall component containing the signal processing unit is, in this illustration, constructed and arranged so that it can fit behind outer ear 201 in a BTE (behind-the-ear) configuration, but may also be worn on different parts of the recipient's body or clothing.

In some embodiments, the signal processor (also referred to as the sound processor) may produce electrical stimulations alone, without generation of any acoustic stimulation beyond those that naturally enter the ear. While in still further embodiments, two signal processors may be used. One signal processor is used for generating electrical stimulations in conjunction with a second speech processor used for producing acoustic stimulations.

As shown in FIGS. 1D and 1E, a receiver in the ear 250 is connected to the spine of the BTE (a general term used to describe the part to which the battery 270 attaches, which contains the signal (sound) processor and supports various components, such as the microphone—more on this below) through cable 252 (and thus connected to the sound processor/signal processor thereby). Receiver in the ear 250 (as distinguished from a simple receiver—the body of the receiver in the ear 250 supports a receiver—more on this in a moment) includes a housing 256, which may be a molding shaped to the recipient. Inside receiver in the ear 250 there is provided a capacitor 258, receiver 260 and protector 262. Also, there may a vent shaft 264 (in some embodiments, this vent shaft is not included). Receiver in the ear may be an in-the-ear (ITE) or completely-in-canal (CIC) configuration.

Figure 1F:
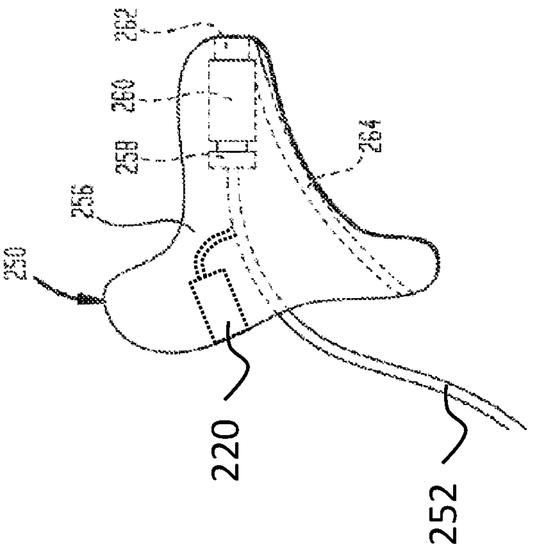

In an exemplary embodiment, sound transducer 220 can be located on element 250 (e.g., opposite element 262, as seen for example in FIG. 1F), so that the natural wonders of the human ear can be utilized to funnel sound in a more natural manner to the sound transducer. In an exemplary embodiment, sound transducer 242 is in signal communication with remainder of the BTE device via cable 252, as is schematically depicted in FIG. 1F via the sub cable extending from sound transducer 242 to cable 252.

Also, FIG. 1D shows a removable power component 270 (sometimes battery back, or battery for short) directly attached to the base of the body/spine 230 of the BTE device. As seen, the BTE device in some embodiments control buttons 274. The BTE device may have an indicator light 276 on the earhook to indicate operational status of signal processor. Examples of status indications include a flicker when receiving incoming sounds, low rate flashing when power source is low or high rate flashing for other problems.

Returning to FIG. 1, internal components 244 comprise an internal receiver unit 212, a stimulator unit 226 and an electrode assembly 218. Internal receiver unit 212 comprises an internal transcutaneous transfer coil (not shown), and preferably, a magnet (also not shown) fixed relative to the internal coil. Internal receiver unit 212 and stimulator unit 226 are hermetically sealed within a biocompatible housing. The internal coil receives power and data from external coil 208, as noted above. A cable or lead of electrode assembly 218 extends from stimulator unit 226 to cochlea 232 and terminates in an array 234 of electrodes 236. Electrical signals generated by stimulator unit 226 are applied by electrodes 236 to cochlea 232, thereby stimulating the auditory nerve 238.

In one embodiment, external coil 208 transmits electrical signals to the internal coil via a radio frequency (RF) link. The internal coil is typically a wire antenna coil comprised of at least one and preferably multiple turns of electrically insulated single-strand or multi-strand platinum or gold wire. The electrical insulation of the internal coil is provided by a flexible silicone molding (not shown). In use, internal receiver unit 212 may be positioned in a recess of the temporal bone adjacent to outer ear 201 of the recipient.

As shown in FIG. 1, multimodal system 200 is further configured to interoperate with a user interface 280 and an external processor 282 such as a personal computer, workstation, or the like, implementing, for example, a hearing implant fitting system. Although a cable 284 is shown in FIG. 1A between implant 200 and interface 280, a wireless RF communication may also be used along with remote 286.

While FIG. 1 shows a multimodal implant in the ipsilateral ear, in other embodiments, the multimodal implant may provide stimulation to both ears. For example, a signal processor may provide electrical stimulation to one ear and provide acoustical stimulation in the other ear.

With the above as a primer, embodiments are directed to non-multimodal hearing aids utilizing behind the ear devices (traditional acoustic hearing aids using the teachings herein), and non-multimodal external components of cochlear implants utilizing behind the ear devices (traditional external components of such, embodied in a BTE apparatus, utilizing the teachings herein), and some embodiments are directed to multi-modal arrangements utilizing the teachings herein. Still, as will be detailed, embodiments are also directed to multimodal hearing devices.

That is, while the teachings associated with FIGS. 1, 1D, and 2 (discussed below) disclose an external device with an output that is provided external to the recipient (a receiver/speaker) that is in the form of a conventional hearing prosthesis, the disclosure of such and any teachings herein relating to such also correspond to a disclosure of an external device where the output is a bone conduction vibrator. By way of example, a passive transcutaneous bone conduction device, where the conceptual functionality of element 250 (more on this below) could instead be located at a location in back of the ear in a manner concomitant with such (this being a conceptual representation of the placement of the output device), held by magnets to the head of the recipient as conventional in the art. Also by way of example, the external device can be a percutaneous bone conduction device. These components need not be part of a multimodal hearing prosthesis, but could be standalone devices. Moreover, while the teachings associated with FIGS. 1 and 1D are directed towards a cochlear implant, disclosure of such and any teachings herein relating to such also correspond to a disclosure of an implantable/implanted device where the output is a bone conduction vibrator (such as in the case of an active transcutaneous bone conduction device, where the device of FIG. 1D would be readily understood as an external component of such (with or without the conventional hearing aid functionality) or a middle ear actuator (again, where the device of FIG. 1D would be readily understood as an external component of such) or a direct acoustic cochlear stimulator actuator (again, FIG. 1D being a representative external component of such), or any other implanted mechanical device that imparts mechanical energy to tissue of the recipient. Put another way, the disclosure of the output devices relating to the external component vis-à-vis the receiver also corresponds to a disclosure of an alternate embodiment where the output device is a vibrator of a bone conduction device by way of example. Also, the disclosure of the output device relating to the implanted component vis-à-vis the cochlear implant electrode array also corresponds to a disclosure of an alternate embodiment where the output device is a vibrator of a bone conduction device or the actuator of a middle ear implant or the actuator of a direct acoustic cochlear stimulator, by way of example.

Figure 2:
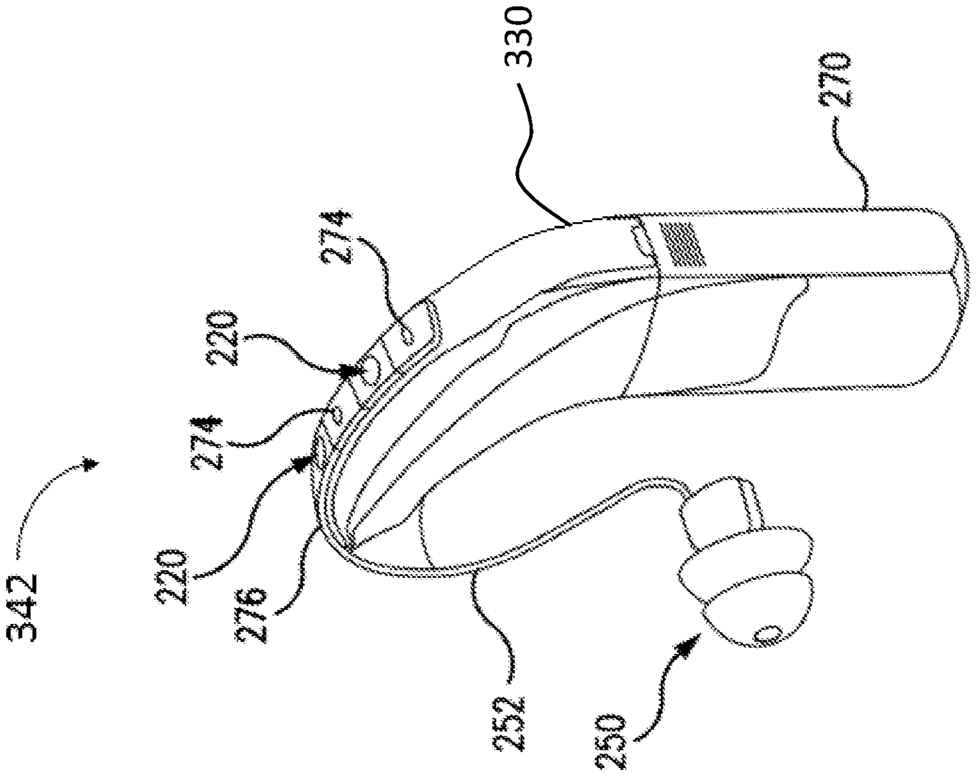

FIG. 2 depicts an exemplary BTE device 342 according to an exemplary embodiment. As seen, BTE device 342 includes element 330, which functionally and structurally can, in some embodiments, correspond to element 230 above, with exceptions according to the teachings herein, and thus corresponds to the spine of the BTE device. However, hereinafter, element 330 will be referred to by its more generic name as the signal processor sub-assembly, or sometimes the electronics component of the BTE device, or sometimes, for short, the signal processor, or sound processor subassembly, or sound processor for short (but that is distinguished from the processor therein, which processes sound/signals, and are also referred to as a sound processor or signal processor—this is the pure electronics portion of the overall signal processor subassembly, the latter having a housing and supporting other components), in some instances. As can be seen, attached thereto is element 270 which is thus a power component of the BTE device, which in some instances herein will be referred to as the battery sub-assembly, or the battery for short. The battery sub-assembly 270 is removably attached to the sound processor sub-assembly 330 via, for example, a bayonet connector, the details of which will be described below.

In an exemplary embodiment, BTE device 342 is a conventional hearing aid apparatus. In the ear component 250 can correspond to any of those detailed herein and/or variations thereof. Simply put, the behind the ear device 342 is a conventional hearing aid configured for only external use. It is not an implantable component and does not include implantable components, and is not configured to electromagnetically communicate with an implantable component.

It is noted that the teachings detailed herein and/or variations thereof can be utilized with a non-totally implantable prosthesis. That is, in some embodiments, the cochlear implant 100, the cochlear implant 100 is a traditional hearing prosthesis. The teachings herein can also be implemented in and in some embodiments are so implemented with respect to other types of prostheses, such as middle ear implants, active transcutaneous bone conduction devices, passive transcutaneous bone conduction deices, percutaneous bone conduction devices, and traditional acoustic hearing aids, alone or in combination with each outer (and/or with the cochlear implant), the combination achieving the bimodal prosthesis. Also, in some embodiments, the teachings detailed herein and/or variations thereof and embodiments include the teachings herein utilized in totally implantable prostheses, such as those that are totally implantable middle ear implants, active transcutaneous bone conduction devices, alone or in combination with each outer (and/or with the cochlear implant), the combination achieving the multimodal prosthesis.

To be clear, the prostheses herein can include any one or more of an acoustic hearing aid, a percutaneous bone conduction device, a passive transcutaneous bone conduction device, an active transcutaneous bone conduction device, a middle ear implant, a DACS, a cochlear implant, a dental bone conduction device, etc. Thus, any disclosure of one corresponds to a disclosure of any of the others herein and thus a disclosure of using the teachings associated with one with the others unless otherwise noted and unless the art enables such.

In some exemplary embodiments, a signal sent to the stimulator of the cochlear implant or to the receiver of the conventional hearing aid, or other respective output transducer of a respective prostheses, can be derived from an external microphone, in which case the system is called a semi-implantable device, or from an implanted microphone, which then refers to a fully implantable device. DACIs can also use an implanted microphone, and thus are also fully implantable devices. Fully implantable devices can have utility by presenting improved cosmesis, having an improved immunity to certain noises (e.g., wind noise), presenting few opportunities for loss or damage, and can at least sometimes be more resistant to clogging by debris or water, etc. DACIs can have utilitarian value by keeping the ear canal open, which can reduce the possibility of infection of the ear canal, which otherwise is humid, often impacted with cerumen (earwax), and irritated by the required tight fit of a non-implanted hearing aid.

Implanted microphones can detect pressure. In at least some embodiments, they are configured to detect air pressure which is subsequently transmitted through the tissue to the microphone. Implanted microphones can detect other pressures presented to their surface, which can be undesirable in certain circumstances. One type of pressure which can represent an impairment to the performance of an implanted microphone is pressure due to acceleration. In some embodiments, such acceleration can have a deleterious effect on a hearing prosthesis if it is in the desired operational frequency range of the prosthesis, typically 20 Hz to 20 kHz, 20 Hz to 10 kHz or 20 Hz to 8 kHz, although narrower ranges still give satisfactory speech intelligibility. Accelerations may arise from, for example, foot impact during walking, motion of soft tissue relative harder tissues, wear of harder tissues against each other, chewing, and vocalization. In the case of a DACI, the acceleration can be caused by the actuator driving the ossicles.

In some embodiments, the accelerations induce pressure on the microphone, which cannot distinguish the desired pressure due to external sounds from the largely undesired pressure due to internal vibration originating directly from the body, or borne to the microphone through the body from an implanted actuator. The accelerations can be thought of as giving rise to these pressures by virtue of the microphone being driven into the tissue. If the microphone is securely mounted on the skull, and the skull vibrates normal to its surface, the microphone diaphragm will be driven into the tissue which, due to the mass, and hence inertia of the tissue, can present a reactive force to the microphone. That reactive force divided by the area of the microphone is the pressure generated by acceleration. The formula for acceleration pressure can be:

$$\Delta P=\rho\cdot t\cdot a$$

where ΔP is the instantaneous pressure above $P_0$, the ambient pressure, ρ is the mean density of tissue over the microphone, t is the mean thickness of tissue over the microphone, and a is the instantaneous acceleration. When the acceleration is normal, but into the surface rather than away from the surface, a decrease in pressure is generated, rather than an increase.

In some instances, there can be utilitarian value to reducing signal outputs due to acceleration. Because the relative body-borne to air-borne pressure of an implanted microphone is typically 10-20 dB higher than what occurs in normal hearing, body originating sounds can be louder relative to externally originating sound. Such large ratios of vibration to acoustic signals are experienced by a recipient as banging and crashing during movement, very noisy chewing, and their own voice being abnormally loud relative to other speakers. At the same time, it should be noted that there is utilitarian value in avoiding the cancellation of all or part of the recipient's own voice. Complete cancellation of the recipient's own voice can result in, in some embodiments, the recipient speaking very loudly compared to other speakers. It is therefore utilitarian to reduce the ratio of vibration to acoustic signals to a level, such as a comparable level, to that found in normal hearing. In some embodiments, this can be achieved by an effective reduction of the acceleration pressure/air-borne pressure sensitivity of 10-20 dB. By doing so, a ratio of acoustic signal to vibration signal similar to what is experienced in normal hearing, and hence a more natural listening experience, can be achieved.

Additionally, signal borne by the body from an actuator as in a DACI can be amplified by the signal processing of the implant, and can present a gain of greater than 1 at some frequency around the loop formed by the microphone, signal processing, actuator, and tissue. This can be the case when dealing with high gains, such as may be the case with moderate to large hearing loss. Under such circumstances, unless additional steps are taken, such as are disclosed herein, the hearing prosthetic system can undergo positive feedback at some frequency and begin "singing," or oscillating. This oscillation can reduce the speech intelligibility, effectively masking out at least the frequency at which oscillation is occurring at, and often other frequencies through a psychoacoustic phenomenon called spread of masking. It can be annoying for the recipient, because the oscillation can occur at a very loud level, and increases the load on the battery, shortening required time between changing or charging batteries. This can require a much greater reduction in feedback of 25-55 dB (often 35-45 dB), and can depend upon the hearing loss of the recipient, as the more hearing loss of the recipient, the more gain will need to be given in the signal processing, at least in some instances. It can therefore be seen that a fully implantable DACI can need more attenuation to reduce (including eliminate) feedback to balance air to bone conducted sound level differences, such as might be needed in a fully implantable cochlear implant.

An exemplary embodiment that includes an implantable microphone assembly utilizes a motion sensor to reduce the effects of noise, including mechanical feedback and biological noise, in an output response of the implantable microphone assembly. In an exemplary embodiment, the diaphragm of the implantable microphone assembly that vibrates as a result of waves traveling through the skin of the recipient originating from an ambient sound, can be also affected by body noise and the like. To actively address non-ambient noise sources (e.g., body noise conducted through tissue of a recipient to a microphone, which in at least some embodiments is not of an energy level and/or frequency to be audible at a location away from the recipient, at least not without sound enhancement devices) of vibration of the diaphragm of the implantable microphone and thus the resulting undesired movement between the diaphragm and overlying tissue, some embodiments utilize a motion sensor to provide an output response proportional to the vibrational movement experienced by the microphone assembly. Generally, the motion sensor can be mounted anywhere such that it enables the provision of a sufficiently accurate representation of the vibration received by the implantable microphone in general, and the diaphragm of the implantable microphone, in particular. The motion sensor can be part of the assembly that contains the microphone/diaphragm thereof, while in an alternate embodiment it can be located in a separate assembly (e.g., a separate housing etc.). In an exemplary embodiment, the motion sensor is substantially isolated from the receipt of the ambient acoustic signals originating from an ambient sound that pass transcutaneously through the tissue over the microphone/diaphragm of the microphone and which are received by the microphone diaphragm. In this regard, the motion sensor can provide an output response/signal that is indicative of motion (e.g., caused by vibration and/or acceleration), whereas a transducer of the microphone can generate an output response/signal that is indicative of both transcutaneously received acoustic sound and motion. Accordingly, the output response of the motion sensor can be removed from the output response of the microphone to reduce the effects of motion on the implanted hearing system.

Figure 3:
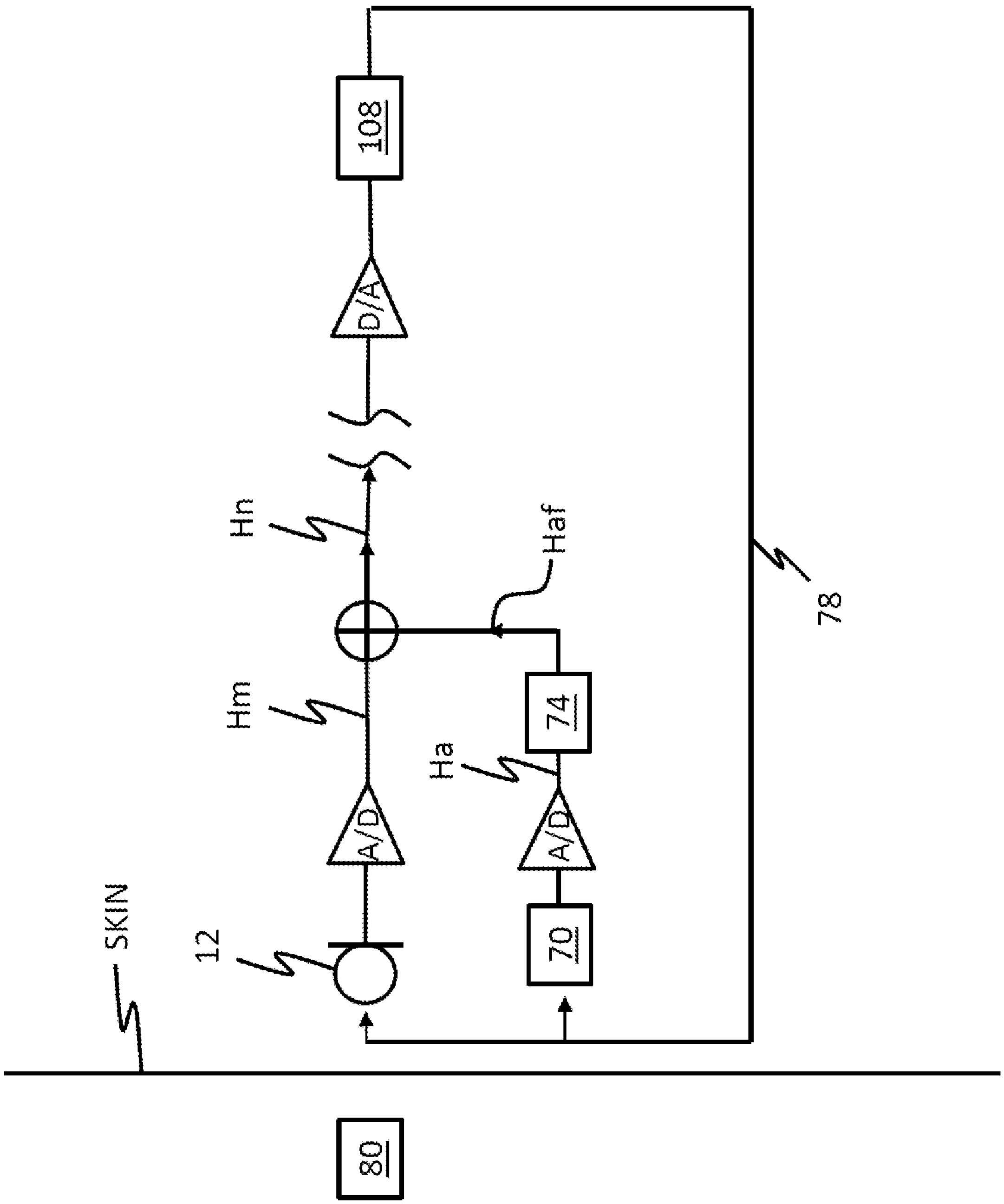
FIGS. 3-3B present exemplary schematics of basic noise cancellation techniques upon which the present teachings build.

Accordingly, to remove noise, including feedback and biological noise, it is utilitarian to measure the acceleration of the microphone assembly. FIG. 3 schematically illustrates an implantable hearing system (but could also be applicable to an external system) that incorporates an implantable microphone assembly having a microphone 12 including a diaphragm and motion sensor 70 (sometimes referred to as an accelerometer herein). As shown, the motion sensor 70 further includes a filter 74 that is utilized for matching the output response Ha of the motion sensor 70 to the output response Hm of the microphone 12. Of note, the diaphragm of microphone 12 is subject to desired acoustic signals (i.e., from an ambient source 103), as well as undesired signals from biological sources (e.g., vibration caused by talking, chewing, etc.) and, depending on the type of output device 108 (e.g., bone conduction vibratory apparatus, hearing aid receiver, DACI actuator, and in some instances, cochlear implant electrode array) feedback from the output device 108 received by a tissue feedback loop 78. In contrast, the motion sensor 70 (accelerometer) is substantially isolated (which includes totally isolated) from the ambient source and is subjected to only the undesired signals caused by the biological source and/or by feedback received via the feedback loop 78. Accordingly, the output of the motion sensor 70 corresponds the undesired signal components of the microphone 12. However, the magnitude of the output channels (i.e., the output response Hm of the microphone 12 and output response Ha of the motion sensor 70) can be different and/or shifted in phase and/or have a shifted frequency response. In order to remove the undesired signal components from the microphone output response Hm, the filter 74 and/or the system processor can be operative to filter one or both of the responses to provide scaling, phase shifting and/or frequency shaping. The output responses Hm and Ha of the microphone 12 and motion sensor 70 are then combined by summation unit 76, which generates a net output response Hn that has a reduced response to the undesired signals, at least if the filter 74 has the correct response. FIG. 3 depicts a prior system upon which the teachings herein build/utilize, and is thus prior art.

In order to implement a filter 74 for scaling and/or phase shifting the output response Ha of a motion sensor 70 to remove the effects of feedback and/or biological noise from a microphone output response Hm, a system model of the relationship between the output responses of the microphone 12 and motion sensor 70 is identified/developed. That is, the filter 74 can be operative to manipulate the output response Ha of the motion sensor 70 to biological noise and/or feedback, to replicate the output response Hm of the microphone 12 to the same biological noise and/or feedback. In this regard, the filtered output response Haf and Hm may be of substantially the same magnitude and phase prior to combination (e.g., subtraction/cancellation). However, it will be noted that such a filter 74 need not manipulate the output response Ha of the motion sensor 70 to match the microphone output response Hm for all operating conditions. Rather, the filter 74 can match the output responses Ha and Hm over a predetermined set of operating conditions including, for example, a desired frequency range (e.g., an acoustic hearing range) and/or one or more pass bands. Note also that the filter 74 can accommodate the ratio of microphone output response Hm to the motion sensor output response Ha to acceleration, and thus any changes of the feedback path which leave the ratio of the responses to acceleration unaltered have little or no impact on good cancellation. Such an arrangement thus can have significantly reduced sensitivity to the posture, clenching of teeth, etc., of the recipient.

Figure 3A:
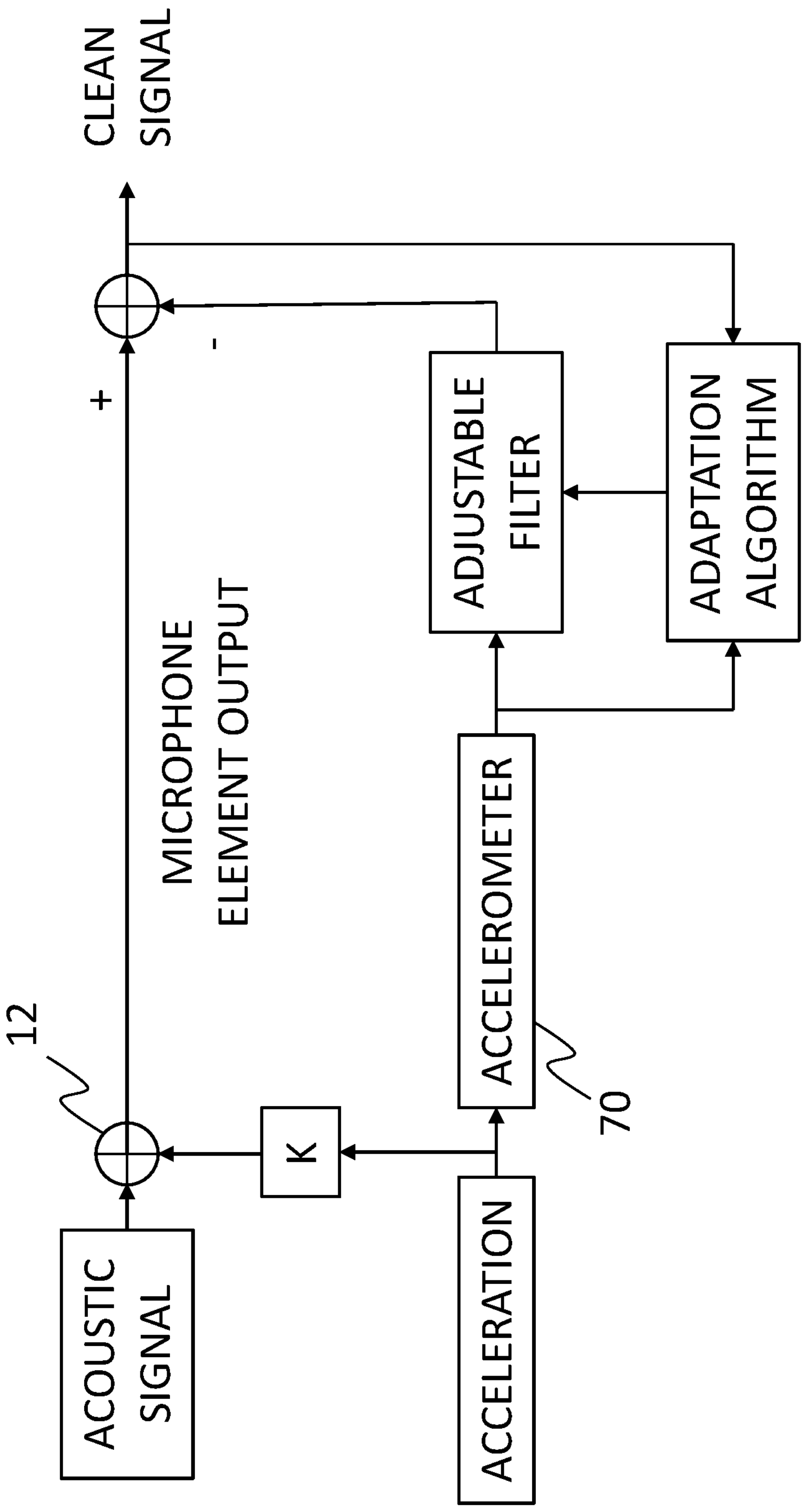

An exemplary embodiment utilizes adjustable filters, such as, by way of example only and not by way of limitation, adaptive filter(s), to filter out body noise and the like. More particularly, FIG. 3A functionally illustrates an exemplary use of such adaptive filters. (It is noted that other configurations can be implemented using adjustable filters that are not adaptive filters. Any filter arrangement that can enable the teachings detailed herein and/or variations thereof to be practiced can be utilized in at least some configurations.) In FIG. 3A, which is prior art, and presented to show the concept of adjustable filters, biological noise is modeled by the acceleration at the microphone assembly filtered through a linear process K. This signal is added to the acoustic signal at the surface of the microphone element. In this regard, the microphone 12 sums the signals. If the combination of K and the acceleration are known, the combination of the accelerometer output and the adaptive/adjustable filter can be adjusted to be K. This is then subtracted out of the microphone output at the adder. This will result in the cleansed or net audio signal with a reduced biological noise component. This net signal may then be passed to the signal processor where it can be processed by the hearing system.

Figure 3B:
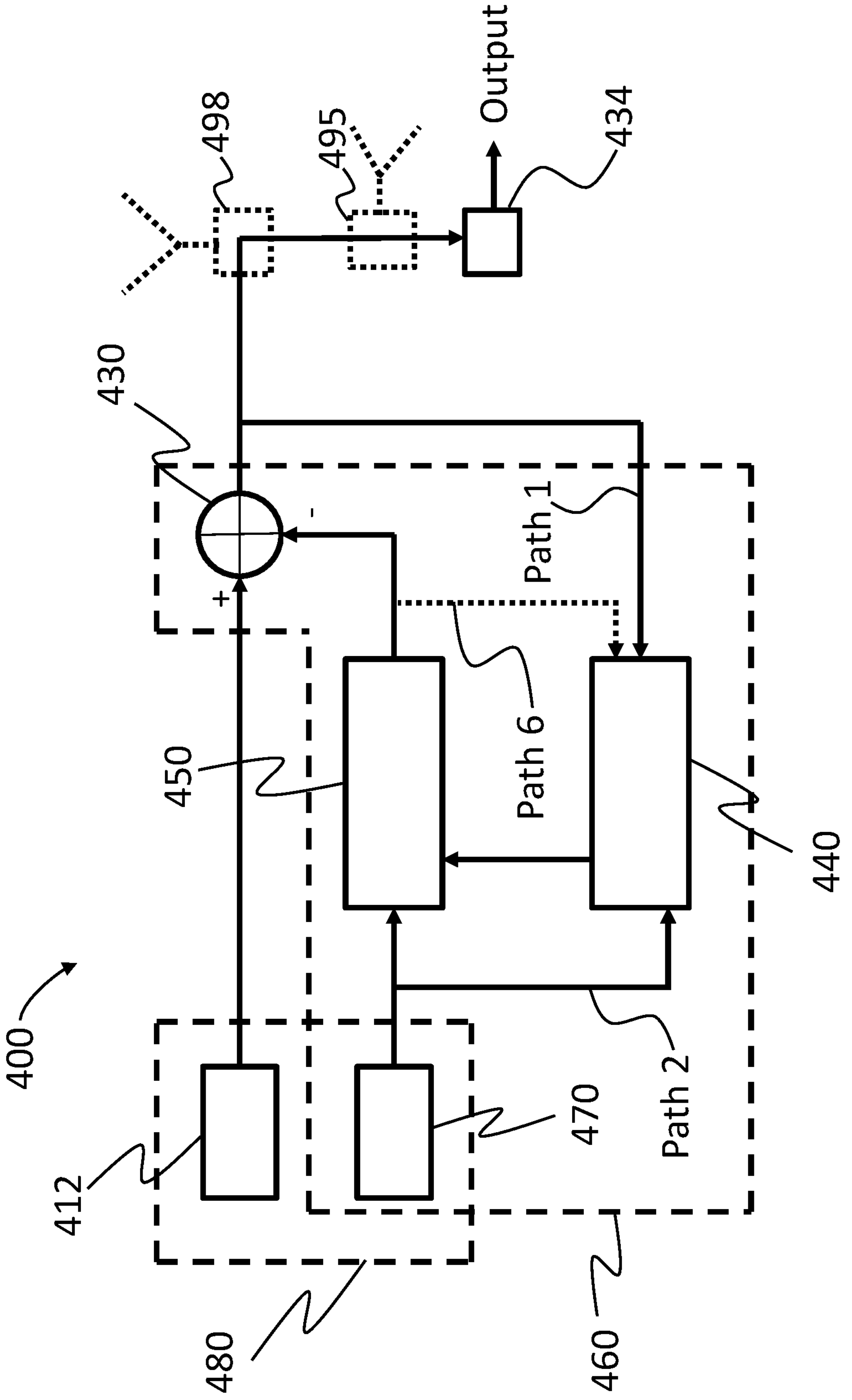

FIG. 3B functionally depicts a system 400 that is usable in/with the hearing prostheses detailed herein that functionally operates in accordance with the schematic of FIG. 3A, along with additional functionality as will be detailed below. FIG. 3B is also prior art. As can be seen, the system 400 includes microphone 412 (corresponding to any of the microphones herein) and accelerometer 470 (corresponding to any of the motion sensors/accelerometers detailed herein). The microphone 412 is configured such that it receives signals resulting from the ambient sound, as well as biological noise/body noise, including, in at least some scenarios, signals resulting from a recipient's own voice that travels through the body via bone conduction/tissue conduction, and in some scenarios of use, the microphone is so positioned during use. Also, in some instances of use, the microphone 412 receives/captures energy from the output device (e.g., vibrations from a bone conduction vibrator, the acoustic signal of a receiver of a conventional hearing aid, a middle ear vibrator, etc.). These latter signals are added at the microphone 412 to the signals resulting from ambient sound because the microphone 412 detects all of these signals in some instances (if present). Conversely, accelerometer 470 is, in some instances, functionally isolated from the signals resulting from the ambient sound, and generally only responds to body noise signals, vibrations traveling through the body, motion signals and/or feedback signals/signals from the output device. The system 400 incorporates an adaptive filter apparatus 450 controlled by adaptive algorithm 440 that runs an adaptive algorithm to control the filter(s) of the adjustable filter apparatus 450. Some details of the adaptive algorithm are provided below, but briefly, as can be seen, the output of the adaptive filter apparatus 450, controlled by filter adaptive algorithm 440, is fed to adder 430, wherein it is added to (or, more accurately, subtracted from) the output of the microphone 412, and then passed on to a signal processor and/or an output device (conceptually represented by black box 434—this could be a receiver of a conventional hearing aid or could be a signal processor of a cochlear implant or could be a signal processor of a hearing aid that outputs a signal to a receiver of a hearing aid, etc., or could be a receiver stimulator of a cochlear implant, an actuator of a DACI, and/or an actuator (vibrator) of an active transcutaneous bone conduction device) of the hearing prosthesis system 400. Collectively, the accelerometer 470, the adjustable filters 450, the filter adaptive algorithm 440, and the adder 430 correspond to an adaptive noise cancellation sub-system 460. Adaptive algorithm 440 runs the adaptive algorithm to control the filter(s) of the adjustable filter apparatus 450 based on, for example, at least in part, feedback of the signal outputted by the adder 430. Adaptive algorithm 440/controller can be a chip or a microprocessor or any control device used in the art to control an adaptive filter 450, as will be detailed further below vis-à-vis controller 566 and controller 666.

Adaptive filters can perform this process using the ambient signals of the acceleration, and the acoustic signal plus the filtered acceleration. The adaptive algorithm and adjustable filter can take on many forms, such as continuous, discrete, finite impulse response (FIR), infinite impulse response (IIR), lattice, systolic arrays, etc. Some exemplary algorithms for the adaptation algorithm include stochastic gradient-based algorithms such as the least-mean-squares (LMS) and recursive algorithms such as RLS. Alternatively, and/or in addition to this, algorithms which are numerically more stable can be utilized in some alternate configurations, such as the QR decomposition with RLS (QRD-RLS), and fast implementations somewhat analogous to the FFT. The adaptive filter can incorporate an observer, that is, a module to determine one or more intended states of the microphone/motion sensor system. The observer can use one or more observed state(s)/variable(s) to determine proper or utilitarian filter coefficients. Converting the observations of the observer to filter coefficients can be performed by a function, look up table, etc. In some exemplary configurations, adaptation algorithms can be written to operate largely in the digital signal processor "background," freeing needed resources for real-time signal processing.

Still referring to FIG. 3B, it can be seen that the system 400 includes two different feedback paths from adder 430 to the adaptive algorithm 440. The first path, path 1, is a path that inputs an unmodified signal from the adder 430 back into the adaptive algorithm 440. In this regard, in an exemplary arrangement, adaptive algorithm 440 controls the filters based solely on the output from the adder 430 or based solely on the output from the adder 430 and the other inputs into the adaptive algorithm 440 as may be utilitarian that enable the adaptive noise cancellation sub-system 460 to operate. Adaptive algorithm 440 runs the adaptive algorithm to control the filter(s) of the adjustable filter apparatus 450 based on, for example, at least in part, feedback of the signal outputted by the adder 430.

It is briefly noted that FIG. 3B depicts transmitter 498 and receiver 495 (or transceiver(s) in some arrangements) that enable wireless transmission of the output from the adder 435 to component 434, which represents an exemplary arrangement, an active transcutaneous bone conduction device that transcutaneous and transmits an inductance signal to an implanted coil implanted in a recipient, or how a cochlear implant operates for that matter. In some arrangements, these are present, as represented by the dashed lines, and in other arrangements they are not present (such as in the case of a conventional hearing aid, or such as in the case of a totally implantable hearing prostheses, such as in the case of a percutaneous and/or passive transcutaneous bone conduction device, etc.).

Is briefly noted that the presence or absence of dashed lines does not represent definitively that a device is optional or may or may not be present. To be clear, in at least some exemplary embodiments of the teachings herein, any component disclosed herein, or any functionality disclosed herein, or method action disclosed herein can be explicitly included or explicitly excluded from some embodiments unless otherwise noted, providing that the art enables such.

It is also briefly noted that in an exemplary arrangement that so utilizes the wireless transmission/communication, a signal processor or other components could be located before transmitter 498. Typically, the output device would always be located at the far end of the communication system, in at least some exemplary arrangements, and thus the output transducer actuator where the receiver stimulator of a cochlear implant would receive signals outputted from the receiver 495/transceiver 495.

Some exemplary embodiments of the teachings herein utilize some or all of the features associated with the embodiments of FIGS. 3 to 3B, as will be seen below. In an exemplary embodiment, the teachings herein are a replacement for the arrangement of FIGS. 3 to 3B (replacement in the sense that carburetor supplied engines were "replaced" with fuel injected engines in new cars in the late 80s and early 90s). In an exemplary embodiment, there are existing hearing prosthesis systems that utilize the arrangement of FIGS. 3 to 3B, the teachings herein utilized those hearing prostheses except with the teachings herein related to the noise cancellation systems (thus replacing such/expanding on such). More particularly, an exemplary embodiment includes a hearing prosthesis, such as the hearing prosthesis 10 of FIG. 1, or that of FIG. 2, by way of example only and not by way of limitation, including the system 400 of FIG. 3B, that includes an implantable microphone, such as implantable microphone 412, and a noise cancellation system, such as by way of example only and not by way of limitation, the adaptive noise cancellation sub-system 460 (although in other embodiments, it is noted that the noise cancellation system need not be an adaptive noise cancellation system—any adjustable noise cancellation system can be utilized in at least some embodiments). In this exemplary embodiment, the hearing prosthesis is configured to set an operational parameter of the noise cancellation sub-system based on input from a microphone external to or internal to a recipient of the prosthesis.

During at least some exemplary scenarios of use, the output signal from the microphone 412 contains a component corresponding to ambient sound of the recipient that impinges upon the skin of the recipient (in the case of a totally implantable prosthesis and is transferred to the microphone through the tissue of the recipient) or contains a component corresponding to ambient sound of the recipient that impinges upon the microphone located outside the recipient in the case of a partially implantable prosthesis or a totally external prosthesis (or a telephone or a headset, etc.) that is the desired signal component that enables the recipient of the hearing prosthesis system 400 to hear ambient sound (e.g., a person speaking to the recipient). Also during this operation, the output signal from the microphone 412 can additionally contain a component corresponding to noises that originate from within the recipient and/or conducted by the tissue of the recipient directly to the microphone 412 (i.e., without passing through the ambient air—hereinafter, these noises are referred to as "body conducted noise" for linguistic convenience) and/or feedback from the output device or other unwanted signals. These signal components are generally considered undesirable noise, and in an exemplary embodiment, the noise cancellation sub-system cancels at least a portion of this noise.

That is, during operation of the hearing prosthesis system 400, coupled with operation of the adaptive noise cancellation sub-system 460, output from the accelerometer 470, which ideally has no component based on the ambient sound originating from outside the recipient, as filtered by filters 450 (e.g., in an adaptive matter), is subtracted from the output of the microphone 412 at adder 430. This resulting signal (corresponding to signal path 1) ideally has no residual body conducted noise component. That is, if the accelerometer 470 were operating at maximum efficiency and the input into the accelerometer corresponded exactly to the body conducted noise component that is input into the microphone 412, the output of the adder 430 would not include any body conducted noise portion (because it would then subtracted out).

Still further by example, signal path 2 corresponds to a signal path that represents the output of the accelerometer 470 without modification relating to output of the microphone 412 and modification resulting from filters 450 (e.g., path 5 extends from the signal path between the output of the accelerometer 470 and the filter 450, where the adder 430 is downstream of the filter 450). Signal path 2 corresponds to a signal path that represents the output of the accelerometer 470.

Moreover, while exemplary embodiments presented in FIG. 3B show all paths leading to the adaptive algorithm 440, an alternate embodiment, these paths need not lead to the adaptive algorithm 440 (with the possible exception of path 1). Indeed, by way of example only and not by way of limitation, at least some of the paths could instead or in addition lead to a memory unit or a processor/chip/control device separate from the adaptive algorithm 440. For example, path 1 and/or path 2 can lead to a memory unit that is located externally to the recipient and used in a temporally effective manner.

The teachings above relating to FIGS. 3-3B are a basic framework upon which the teachings of this application in at least some embodiments improve upon. Embodiments utilize some or all of the teachings detailed above with respect to these figures, but the present invention is directed towards the following. In this regard, the teachings above relating to FIGS. 3 to 3B correspond to a hearing prosthesis system 400 that utilizes one single adaptive filter/one single adaptive noise cancellation subsystem to cope with the various signals that are received by the hearing prosthesis, which by way of example only and not by way of limitation in some embodiments and by way of limitation in other embodiments results from (1) external ambient sounds that are desired to be captured by the microphone, (2) body noise which includes own voice and body generated sounds, and (3) acoustic/vibrational feedback from output device(s) of the hearing prostheses or other output that is received by the hearing prosthesis. The embodiments of the hearing prosthesis system 400 tends to remove the unwanted noise (e.g., body noise and acoustic/vibrational feedback/output from the prosthesis). Conversely, the following teachings relate to an embodiment of a hearing prosthesis system that utilizes two or more adaptive filter/adaptive noise cancellation subsystems. In some embodiments, these filters/subsystems do utilize various features of that detailed above with respect to system 400, but the overall architecture is different as will now be detailed.

More specifically, the present inventors have determined that body noises are only partially removed by the system 400, in at least some instances. Moreover, in an exemplary embodiment the feedback, which can be admitted as sound waves by the skull bone and/or the tympanic membrane is at least in some instances not treated.

Figure 4:
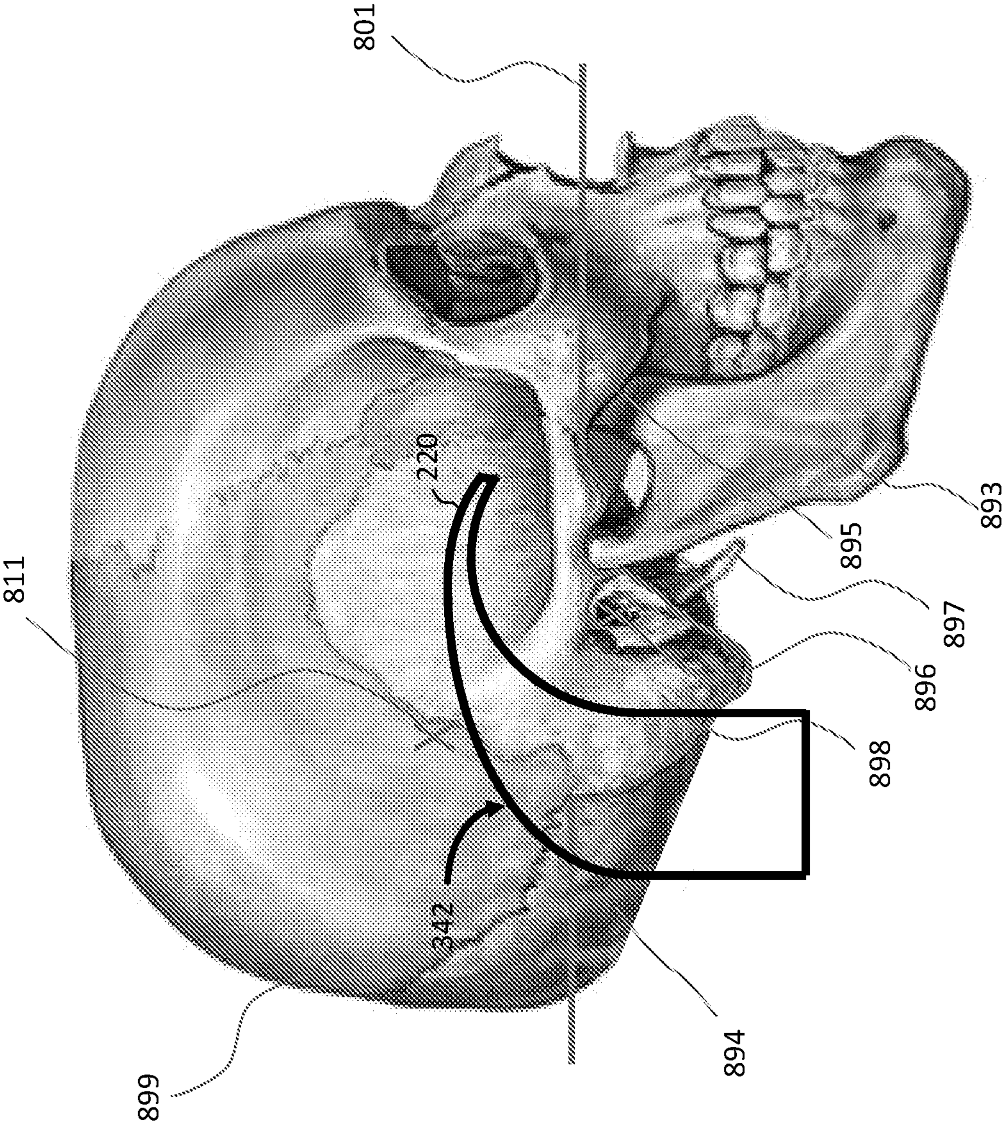
FIG. 4 presents a schematic of a skull detailing bones that tend to propagate vibration that causes feedback.

FIG. 4 depicts a side view of a human skull that has been annotated. As can be seen, the parietal bone 899 and the occipital bone 894 abut the mastoid bone 898. The zygomatic bone 895 and the mandible bone 893 are depicted to the right of the external acoustic canal 896. It is noted that the styloid process 897 is not considered to be part of the mastoid bone 898 for the purposes of this application. Superimposed upon the view of the skull is a borderline 801. Traveling from right to left, the borderline 801 extends along a horizontal line that has the same latitude (direction up and down with respect to the frame of reference of FIG. 8A) as the junction of the temporal bone and the zygomatic bone. The borderline then follows the lower border of the mastoid bone to the location where the mastoid bone and the occipital bone and the parietal bone meet, and then extends along a horizontal line that has the same latitude as that meeting junction. It can be seen that the jawbone 893 is on the other side of the borderline 801. In an exemplary embodiment, vibrations and energy that result from the output of the implanted hearing prosthesis and some embodiments can travel through the bone(s) of the head to the microphone of the hearing prosthesis and thus be captured as feedback by the hearing prosthesis. In some embodiments, the bones above the borderline 801 are more conducive to such energy transfer than that below, more accurately, typically, the microphone of the hearing prosthesis, whether implanted or exterior to the recipient, is typically located above borderline 801. Briefly, reference numeral 811 indicates an "X" which in an exemplary embodiment is where an implantable microphone can be located above the skull bone between the skin and the skull bone. Also seen superimposed over the image of the skull is BTE device 342 with microphone 220 represented thereon (it is noted that the BTE device could be that of the multimodal hearing prosthesis of FIG. 1 or that of an external component of an active transcutaneous bone conduction device or a passive transcutaneous bone conduction device or an external component of a middle ear implant or an external component of a cochlear implant or any of the other external components of an implantable hearing prosthesis detailed herein and variations thereof). As can be seen, in all of these instances, the microphones are located above boundary line 801.

It is also noted that reference numeral 811 also represents an exemplary location of the microphone that is external to the recipient, which microphone can be part of a removable component of a percutaneous bone conduction device.

In this regard, it can be seen that for both implanted microphones and for external microphones, in at least some exemplary embodiments, the microphones are located at a location where bone conducted noise (even from a conventional hearing prosthesis, energy can travel along bone to reach the microphone) and/or noise traveling through the tympanic membrane and/or bouncing off the tympanic membrane from a receiver) can reach the microphone in a manner that can have a deleterious results with respect to the performance of the hearing prostheses relative to that which would otherwise be the case. Embodiments of at least some of the teachings detailed herein are directed towards reducing, which includes eliminating, the unwanted energy content resulting from such feedback from the output of the prostheses.

Figure 5:
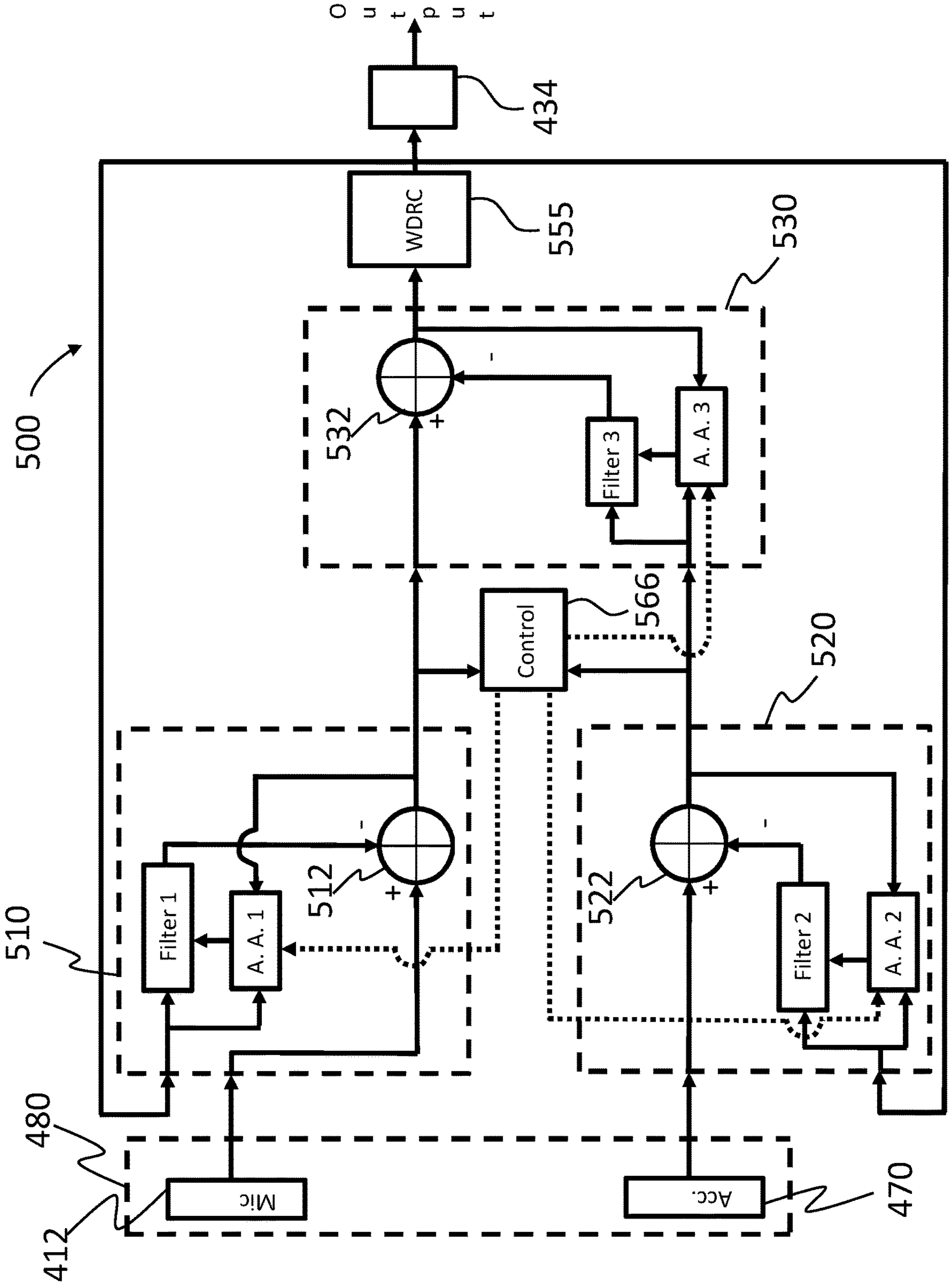
FIGS. 5 and 6 present functional schematics of exemplary embodiments of the invention, as opposed to that of FIGS. 3-3B.

FIG. 5 presents an exemplary hearing prosthesis system 500 that includes a microphone 412 and an accelerometer 470 corresponding to those detailed above and variations thereof and at least some exemplary embodiments. The microphone is more sensitive to external sounds/ambient sounds relative to that of the accelerometer, and the accelerometer is more sensitive to vibrations that travel through the body relative to the microphone, in at least some embodiments. Alternatively, the microphone captures more of the overall energy that reaches the prosthesis relative to that which is the case for the accelerometer. In this regard, the accelerometer is less sensitive to ambient sound relative to the microphone, and, in some embodiments, the accelerometer is totally or at least effectively totally isolated from ambient sound.

System 500 includes three separate adaptive noise cancellation subsystems 510, 520 and 530 that remove unwanted noise, such as the feedback from the output device of the prosthesis and body noises. Collectively, in an exemplary embodiment, the three subsystems can be considered a signal processing arrangement, although as will be noted, there are additional signal processing components, such as a sound processor, which as noted above, can correspond to element 434. Here, unlike a signal feedback reduction arrangement, such as that in FIG. 3B, which subtracts the accelerometer signal (which may be inward facing), from the microphone signal (which may be outwardly facing), there can be utilitarian value by providing the unique feedback pre-processing stages of subsystems 510 and 520 before the subtraction processing. In some embodiments, this can be considered pre-processing stages (subsystems 510 and 520). In some embodiments, these can have fast acting filters specially optimised to minimise acoustic feedback and/or vibrational feedback (noise from the actuator/vibrator), and a slow acting filters optimised to minimise body noise feedback. Following the pre-processing stage, the signal associated with the accelerometer is subtracted from the signal associated with the microphone.

In more detail, as seen is a wide dynamic range compressor (WDRC) 555, which can be utilized to amplify the wanted signals (the output from the overall noise cancellation system). The output from compressor 555 is then provided to the output device, which can be a receiver or an actuator of a middle ear implant or an actuator of a direct acoustic cochlear stimulator or a vibrator of a bone conduction device, all by way of example only and not by way of limitation (and in at least some embodiments, all of which can produce the output generated feedback which the teachings detailed herein are directed).

In the noise cancellation system of FIG. 5, there are three separate (and in some embodiments, no more than three) adaptive filters/adaptive noise cancellation subsystems. In an exemplary embodiment, each of these are directed to cancel or otherwise reduce (herein, the phrases "cancel" and "cancelled" covers reduce) different unwanted energies. As seen, filter 1 which is part of the adaptive noise cancellation subsystem 510, is utilized in a cancellation subsystem to cancel unwanted noise in the output of the microphone 412. Also seen, filter 2 which is part of the adaptive noise cancellation subsystem 520, is utilized in a cancellation subsystem to cancel unwanted noise in the output of the accelerometer 470. Also, there is filter 3, which is part of the adaptive noise cancellation subsystem 530, and is utilized in a cancellation subsystem to cancel unwanted noise that remains in the output from subsystem 510 after subsystem 510 performs its function. In at least some exemplary embodiments, subsystem 530 is a body noise canceler. Also as seen is a controller 566, which can control the speed of adaptation of the different adaptive filters to provide stability of the system or otherwise provide more stability of the system relative to that which would otherwise be the case. In an exemplary embodiment, the control 566 is a microprocessor or a programmable/programmed/preprinted chip or otherwise electronic circuitry that is configured to control the adaptive algorithms (more on this in a moment)/the adaptation of the various filters based on the inputs as seen in FIG. 5 (it is also noted that additional inputs can be provided to control or 566, such as an input from the output of the subsystem 530).

It is briefly noted that the dotted lines indicate control paths as opposed to signal paths in FIG. 5 for the convenience of the viewer.

Some additional features of the system 500 will now be described. Focus will be on the adaptive noise cancellation subsystem 510 with reference to the other subsystems were similar features are present for linguistic economy. More specifically, as can be seen, there is a first input into the adaptive noise cancellation subsystem 510 from the microphone 412 and a second input into the subsystem 510 from the output of the WDRC 555. The output from the microphone 412 is considered the "dirty" signal, and the output from the WDRC 555 is considered the reference signal, and these are the two signals inputted into the adaptive subsystem. In this regard, the operation of subsystem 510 can correspond to the operation of the noise cancellation system in FIG. 3B, albeit utilizing a different input. In this regard, whereas the noise cancellation system of FIG. 3B utilizes a first input that is 100%, based on the raw output from the microphone and a second input that is totally, 100%, based on the raw output from the accelerometer. Conversely, the noise cancellation subsystem 510 does utilize the input from the microphone, but the second input is an input that is influenced only in part by the accelerometer, the second input also includes a portion that is based on the microphone output. This is not the case with respect to the embodiment of FIG. 3B.

The input from the WDRC 555 is sent through filter 1 as shown, which can be an adaptive filter where the coefficients thereof are controlled by the adaptive algorithm 1 (A.A. 1). It is briefly noted that in some embodiments, filter 1 is not an adaptive filter, but can be a standard filter. Moreover, in an exemplary embodiment, filters per se are not utilized, but other signal processing components are utilized in place of and/or in addition to filter 1. Accordingly, in an exemplary embodiment, subsystem 510 can be an adaptive noise cancellation subsystem, while in other embodiments, subsystem 510 is not an adaptive noise cancellation subsystem, but instead a static noise cancellation subsystem.

It is briefly noted that embodiments can utilize filters where coefficients thereof are changing in time according to an optimization algorithm, such as those executed by A.A. 1, 2, and/or 3. In at least some embodiments, the algorithm has two inputs: a dirty signal and a noise reference. The noise reference is filtered and the adaptation rule tries to minimize the error between the dirty signal and the filtered noise reference. Also, as can be seen, embodiments include a feedback canceller that is a system that removes from the signal from the microphone the portion of the signal that results from actuation of the actuator. The cancellation is essentially based on an adaptive filter with an input being the dirty signal from the microphone and the second input being the signal sent to the actuator. Conversely, embodiments include a body noise canceller, which removes components of body noises from the signal outputted by the microphone. It can also be based on an adaptive filter with an input being the signal from the microphone and the second input being the signal from the accelerometer. As will be detailed below, the feedback canceller and the body noise canceller can be quasi combined, and then a residual feedback canceller can be implemented, in some embodiments.

Still, as seen in FIG. 5, and consistent with the embodiment of FIG. 3B, the output from the WDRC 555 is also provided to the adaptive algorithm 1. The operation of the adaptive algorithm 1 corresponds to that associated with the adaptive algorithm of FIG. 3B, at least conceptually and/or functionally. Also consistent with the embodiment of FIG. 3B, a signal is provided to the adaptive algorithm 1 downstream of the adder 512 (more on this in a moment). The output of filter 1, which is a filtered (or modified or new signal) based on the output of WDRC 555, which output is a result of the processing of filter 1 or other signal processing device that is utilized, is provided to adder 512, which is added to the raw signal from microphone 412 (more accurately, subtracted therefrom) and the result of the output from the adaptive noise cancellation subsystem 510 as can be seen.

In this exemplary embodiment, the output of subsystem 510 is a cleaner/first stage cleaned microphone output that has canceled there from the feedback portion that otherwise might have been present (the unwanted energy that is captured by the microphone that originates in the operation of the output device of the prosthesis).

In this exemplary embodiment, there still remains a component of body noise in the outputted signal from the subsystem 510. This is addressed by subsystem 530 as detailed below, but first, we now address adaptive noise cancellation subsystem 520. As seen, the arrangement of subsystem 520 includes components that correspond to that of subsystem 510 (adder 522, filter 2, and adaptive algorithm 2). In this regard, in an exemplary embodiment, the concept and/or the functionality of subsystem 520 is duplicative of that detailed above with respect to subsystem 510, the differences being the input and the control signal from controller 566 (in an exemplary embodiment, controller 566 can separately control the adaptive algorithms differently depending on a given scenario—more on this in a moment). Unlike subsystem 510, subsystem 520 receives the raw signal or a signal based on the raw signal from the accelerometer 470, that signal being the "dirty" signal. The reference signal is the same signal as that which is the case for subsystem 510, although in alternate embodiments, it can be different. In an exemplary embodiment, the controller 566 is an adaptation controller, which analyzes the status of input signals in order to constrain the adaptation rule of the adaptive algorithms, and thus constrain the filters. In at least some embodiments, the speed of adaptation is changed in time according to certain conditions, for example the presence of only body noises against the presence of only external sounds, etc., as will be further detailed below.

In this exemplary embodiment, the output of subsystem 520 is a cleaner/first stage cleaned accelerometer output that has canceled there from the feedback portion that otherwise might have been present (the unwanted energy that is captured by the accelerometer that originates in the operation of the output device of the prosthesis). In this exemplary embodiment, there still remains a component of body noise in the outputted signal from the subsystem 520 (as expected, because that is the purpose of the accelerometer).

In essence, in this exemplary embodiment, instead of utilizing the raw accelerometer signal for the filters of the adaptive noise cancellation system of the embodiment of FIG. 3B, here, a modified/cleaner accelerometer signal is utilized, the signal being cleaner in that the feedback portion thereof has been canceled there from. Moreover, in this exemplary embodiment, instead of utilizing the raw microphone signal as the base signal from which the filtered signal from the accelerometer is subtracted, a cleaner microphone signal is utilized, the signal being cleaner in that the feedback portion thereof has been canceled therefrom.

As seen, the arrangement of subsystem 530 includes components that correspond to that of subsystem 510 (adder 522, filter 2, and adaptive algorithm 2). In this regard, in an exemplary embodiment, the concept and/or the functionality of subsystem 530 is duplicative of that detailed above with respect to subsystem 510, the differences being the input and the control signal from controller 566. Unlike subsystems 510 and 520, subsystem 530 receives the first stage cleaned microphone signal from subsystem 510, that signal being the "dirty" signal. The reference signal is the output from subsystem 520, and with respect to analogy to the adaptive noise cancellation system of FIG. 3B, this corresponds to the signal from the accelerometer. Yet this is not the raw signal or otherwise a signal based on the raw signal from the accelerometer as noted above. Instead, this is a cleaned signal/cleaner signal in that the feedback portion that results from the output of the prosthesis has been canceled from that signal. Subsystem 530 processes the output from the subsystem 520 utilizing adaptive filter 3, and provides the output from adaptive filter 3 to the adder 532, which is subtracted from the output of subsystem 510. As seen, adaptive algorithm 3 also receives the output from adaptive subsystem 520, and receives the output from the adder 532, and the adaptive algorithm 3 utilizes this input to control filter 3 and otherwise adaptive filter 3. The output from adder 532, and thus the output from adaptive subsystem 530, is provided to the WDRC 555 in some embodiments where present, and in other embodiments provided to the output device 434 and/or an intervening sound processor present, the output of which can be then provided to the output device 434.

In an exemplary embodiment shown in FIG. 5, subsystem 530 cancels the body noise component/unwanted signal, from the cleaned microphone signal/signal based on the microphone signal. In this exemplary embodiment, the body noise cancellation portion of the noise cancellation system is executed utilizing input that has been cleaned of feedback noise component/utilizing input where the feedback noise component has been canceled therefrom. This is different from the embodiment of FIG. 3B, where the input signals into the subsystem that is primarily utilized to remove body noise includes at least some feedback components/signals that are not cleaned of feedback components/have not had the feedback components canceled there from.

Accordingly, it can be seen that there are three separate cancelers that are respectively utilized to cancel portions of the signals, and the cancelers are arranged in a parallel manner and then in a serial manner. Put another way, in an exemplary embodiment includes a hearing prosthesis that includes a first and second canceler arranged in parallel, and a first and third canceler arranged in series and a second and third canceler arranged in series. In an exemplary embodiment, the output of the first and second cancelers is the input into the third canceler.

Accordingly, in an exemplary embodiment it can be seen that there are two separate feedback cancelers and one unified body noise canceler. In an exemplary embodiment, the body noise canceler receives signals that are effectively free of feedback components.

As noted above, the prosthesis system 500 includes a controller 566. In an exemplary embodiment, as noted above, this can be a chip or electronic circuitry having a logic arrangement (hardware, software, and/or firmware) that can evaluate output from the first and second and/or third subsystems and develop a control signal to control the sub processors of the first, second and/or third subsystems (510, 520 and 530, respectively), such as by way of example only and not by way of limitation, controlling the adaptation time of the adaptive algorithms 1, 2, and/or 3. (Herein, controlling the adaptation time can include freezing the filters and/or suspending all filtering.) In an exemplary embodiment, typically, the subsystems 510 and 520 are cancellation systems that are fast in adaptation relative to the adaptation of the subsystem 530. In an exemplary embodiment, this can accommodate fast-changing feedback paths. While the embodiment shown in FIG. 5 depicts controller 566 providing a separate control signal to the respective subsystems, in an alternate embodiment, a single control system can be utilized for both subsystems (this would mean that both subsystems are controlled in the same manner). Still, in the embodiment depicted, the controller 566 separately controls each system. In the embodiment present, the body noise canceler/subsystem 530 has a slower adaptation speed/adaptation speed.

In an exemplary embodiment, subsystems 510 and/or 520 have adaptation speeds that are greater than or at least equal to 10, 20, 30, 40, 50, 60, 70, 80, 90, 100, 110, 120, 130, 140, 150, 175, 200, 225, 250, 275, 300, 350, 400, 450 or 500 or more, or any value or range of values therebetween in 1.0 increments (e.g., 7.3, 45.9, 8.4 to 22.22) times that of subsystem 530, and the system is configured to enable such and the controller is configured to control the adaptations of subsystem 510, 520, and/or 530 to have such and the controller is configured to adjust the adaptation speeds to have these features in at least some embodiments.

Further, in an exemplary embodiment, the prosthesis is configured such that subsystem 530 can adapt when (in some embodiments, only when) the controller 556 or other logic system of the prosthesis recognizes a scenario where there is no ambient noise present or otherwise minimal ambient noise present and/or where there is only body noise that is present (and thus embodiments include systems that enable the recognition of such). In this exemplary embodiment, this can be done to avoid adapting and then canceling external sounds.

Further, in an exemplary embodiment, the prosthesis system is configured such that adaptation of one or both of subsystems 510 or 520 is halted (or can be halted—the system can be configured to control the halting of such) or otherwise prevented (or can be prevented, again the system can be configured to control the preventing of such) while subsystem 530 adapts and/or vice versa.

Thus, in an exemplary embodiment, there is a system for reducing noise in a drive signal of a hearing device, such as a hearing prosthesis or a telephone receiver, etc., comprising a microphone (e.g., microphone 412) operative to receive sound and generate a microphone output signal and an accelerometer (e.g., accelerometer 470) operative to receive energy and generate an accelerometer output signal, the energy being energy also received at least in part by the microphone and transduced at least in part by the microphone into the microphone output signal.

In an exemplary embodiment, the system is configured to cancel feedback from the microphone output signal and the accelerometer output signal and output respective cleaner signals. These signals may be modified signals or may be new signals based on the microphone output signal and the accelerometer output signal. The system is further configured to combine the respective signals into a modified signal that is the result of subtraction of a signal based on the respective cleaner signal for the accelerometer from a signal based on the respective cleaner signal for the microphone. It is noted that the phrase "signal based on" means that it could be the exact same signal or a signal that is based on the signal. For example, circuitry could receive a signal and output a signal that is for all intents and purposes identical to the received signal, but it is a separate signal and that it is generated by the circuitry. Both signals (the original and the newly generated signal) would be considered as a signal that is based on the signal.

In an exemplary embodiment, as noted above, the microphone is sensitive to external sounds, and the accelerometer is sensitive to body conducted vibrations and less sensitive to external sounds (including not sensitive to external sounds). In an exemplary embodiment, the microphone receives at least or equal to 1, 1.25, 1.5, 1.75, 2, 2.25, 2.5, 2.75, 3, 3.5, 4, 4.5, 5, 5.5, or 6 or more, or any value or range of values therebetween in 0.05 increments (e.g., 1.85, 2.2, 1.55 to 3.35) times the amount of energy resulting from an ambient sound environment than that received by the accelerometer, all other things being equal. In an exemplary embodiment, the microphone receives at least or equal to 0.5, 0.6, 0.7, 0.8, 0.85, 0.86, 0.87, 0.88, 0.89, 0.90, 0.91, 0.92, 0.93, 0.94, 0.95, 0.96, 0.97, 0.98, 0.99, 1, 1.1, 1.2, 1.3, 1.4, 1.5, 1.6, 1.7, 1.8, 1.9, 2, 2.1, 2.2, 2.3, 2.4 or 2.5 or any value or range values therebetween in 0.005 increments times the energy resulting from body conducted noise that is received by the accelerometer.

As noted above, in some embodiments, the system is configured to independently cancel feedback from the microphone output signal and independently cancel feedback from the accelerometer output signal and output respective cleaner signals from subsystems of the systems. In some embodiments, the system includes a first noise cancellation subsystem that cancels the feedback from the microphone output signal and the accelerometer output signal. The subsystem can be two separate subsystems (or subsubsystems) disclosed above (subsystems or subsubsystems 510 and 520, respectively), or can be a combined subsystem (where filters can be controlled independently or collectively). Consistent with FIG. 5, the system includes a second noise cancellation subsystem (subsystem 530) that subtracts the signal based on the respective cleaner signal for the accelerometer from the signal based on the respective cleaner signal for the microphone. Further, the system is configured to enable the first noise cancellation subsystem to be substantially faster in adaptation relative to adaptation of the second noise cancellation subsystem.

Also, as noted above, in some embodiments, the system includes a first noise cancellation subsystem that cancels the feedback from the microphone output signal and the accelerometer output signal (the collection of subsystems 510 and 520, for example), and the system includes a second noise cancellation subsystem that subtracts the signal based on the respective cleaner signal for the accelerometer from the signal based on the respective cleaner signal for the microphone. Further, the system is configured to independently control adaptation of the first and second subsystems, including halt adaptation of one while another is adapting and vice versa.

Moreover, in some embodiments, the system includes a first noise cancellation sub-system that cancels the feedback from the microphone output signal and the accelerometer output signal and the system includes a second noise cancellation subsystem that subtracts the signal based on the respective cleaned signal for the accelerometer from the signal based on the respective cleaned signal for the microphone and the system is configured to identify an occurrence where only body noises are captured by the microphone and/or the accelerometer and control the second subsystem to adapt during such occurrence.

As noted above, embodiments include wide dynamic range compressors (some embodiments). Thus, in some embodiments, the system is configured to amplify the modified signal outputted by the second subsystem and the system is configured to provide the amplified modified signal to a processor and/or to an output device of the system.

Figure 6:
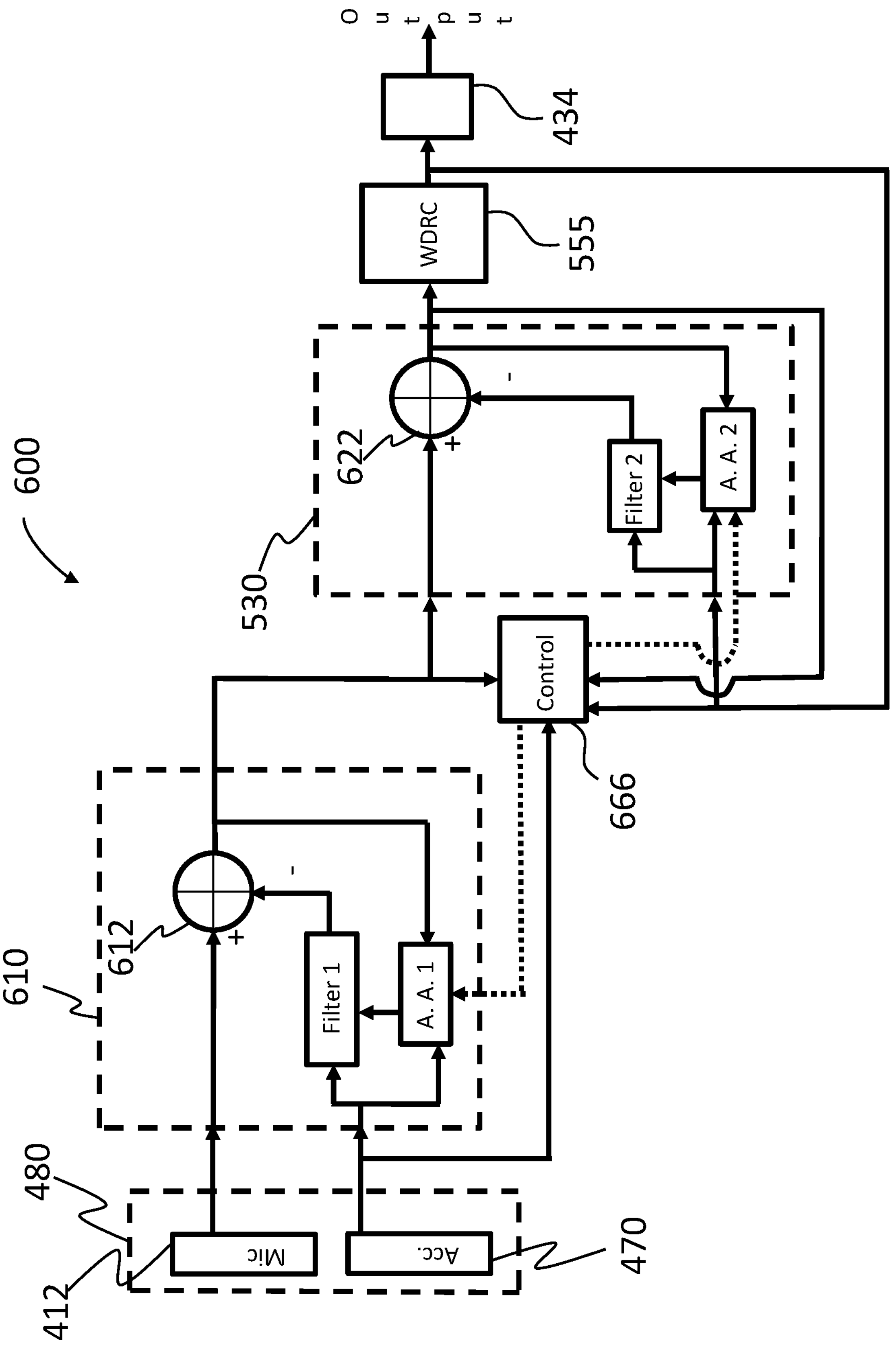

FIG. 6 presents another exemplary embodiment of a noise cancellation system according to some embodiments. Here, this limits the complexity of the system vis-a-vis having three different adaptive filters. In this regard, in this exemplary embodiment, there are two adaptive filters, and, in some embodiments, only two adaptive filters with respect to the noise cancellation system and no more. Here, in this exemplary embodiment this adds on a residual acoustic feedback cancel to the arrangement of FIG. 3B. Put another way, the output of FIG. 3B is provided to a second subsystem (FIG. 3B being a first sub-system) and the output of the first subsystem is further cleaned of residual acoustic feedback. Residual acoustic feedback is discussed in great detail below.

Here, the acoustic feedback constitutes sound waves that are emitted by the skull for example, which vibrate under the influence of the output device of the hearing prostheses. The sound waves are in at least some exemplary scenarios, inevitably captured by the microphone whether that is implanted or an external microphone.

More specifically, FIG. 6 presents an exemplary hearing prosthesis system 600 that includes a microphone 412 and an accelerometer 470 corresponding to those detailed above and variations thereof and at least some exemplary embodiments. The microphone sensitivities and the accelerometer sensitivities and features associated therewith correspond of those detailed above in at least some exemplary embodiments.

System 600 includes two separate adaptive noise cancellation subsystems 610 and 620 that remove unwanted noise, such as body noise and feedback. Subsystem 610 removes feedback and body noise, while subsystem 620 is a residual acoustic feedback canceler. Collectively, in an exemplary embodiment, the two subsystems can be considered a signal processing arrangement, although as will be noted, there are additional signal processing components, such as a sound processor, which as noted above, can correspond to element 434.

Also as seen is a wide dynamic range compressor (WDRC) 555, the performance and utilitarian value in features associated there with in the output thereof being as detailed above in FIG. 5.

In the noise cancellation system of FIG. 6, there are two separate (and in some embodiments, no more than two) adaptive filters/adaptive noise cancellation subsystems. In an exemplary embodiment, each of these are directed to cancel or otherwise reduce different unwanted energies. As seen, filter 1 which is part of the adaptive noise cancellation subsystem 610, is utilized in a cancellation subsystem to cancel unwanted noise in the output of the microphone 412. In this exemplary embodiment, the performance of noise cancellation subsystem 610 and the operation thereof corresponds to the arrangement of FIG. 3B above, with the exception that the adaptation algorithm 1 receives input from a controller that receives additional input beyond that which is the case in FIG. 3B. More on this in a moment, but briefly, as seen, a controller 666, which can control the speed of adaptation of the different adaptive filters to provide stability of the system or otherwise provide more stability of the system relative to that which would otherwise be the case. In an exemplary embodiment, the control 666 is a microprocessor or a programmable/programmed/preprinted chip or otherwise electronic circuitry that is configured to control the adaptive algorithms (more on this in a moment)/ the adaptation of the various filters based on the inputs as seen in FIG. 6.

It is briefly noted that the dotted lines indicate control paths as opposed to signal paths in FIG. 6 for the convenience of the viewer.

Some additional features of the system 600 will now be described. Focus will be on the adaptive noise cancellation subsystem 610 with reference to the other subsystems where similar features are present for linguistic economy. More specifically, as can be seen, there is a first input into the adaptive noise cancellation subsystem 610 from the microphone 412 and a second input into the subsystem 610 from the accelerometer. The output from the microphone 412 is considered the “dirty” signal, and the output from the accelerometer is considered the reference signal, and these are the two signals inputted into the adaptive subsystem 610. In this regard, the operation of subsystem 610 can correspond to the operation of the noise cancellation system in FIG. 3B, using the same input (but different control, in at least some embodiments). In this regard, the noise cancellation subsystem 610 utilizes a first input that is 100% based on the raw output from the microphone and a second input that is totally, 100%, based on the raw output from the accelerometer. The input from the accelerometer is sent through filter 1 as shown, which can be an adaptive filter where the coefficients thereof are controlled by the adaptive algorithm 1 (A.A. 1). It is briefly noted that in some embodiments, filter 1 is not an adaptive filter, but can be a standard filter. Moreover, in an exemplary embodiment, filters per se are not utilized, but other signal processing components are utilized in place of and/or in addition to filter 1. Accordingly, in an exemplary embodiment, subsystem 610 can be an adaptive noise cancellation subsystem, while in other embodiments, subsystem 610 is not an adaptive noise cancellation subsystem, but instead a static noise cancellation subsystem.

Still, as seen in FIG. 6, and consistent with the embodiment of FIG. 3B, the output from the accelerometer 470 is also provided to the adaptive algorithm 1. The operation of the adaptive algorithm 1 corresponds to that associated with the adaptive algorithm of FIG. 3B, at least conceptually and/or functionally. Also consistent with the embodiment of FIG. 3B, a signal is provided to the adaptive algorithm 1 downstream of the adder 612 (more on this in a moment). The output of filter 1, which is a filtered signal (or modified or new signal) based on the output of the accelerometer 470 (there could be a prefilter and/or an amplifier between the accelerometer and the filer 1 (there can also be a prefilter and/or an amplifier between microphone 412 and the adder 612)) which output is a result of the processing of filter 1 or other signal processing device that is utilized, is provided to adder 612, which is added to the raw signal from microphone 412 (more accurately, subtracted therefrom) and the result of the output from the adaptive noise cancellation subsystem 610 as can be seen.

In this exemplary embodiment, the output of subsystem 610 is a cleaner/first stage cleaned microphone output that has canceled therefrom the body noise and feedback that otherwise might have been present, at least some of the feedback (more on this in a moment). In this exemplary embodiment, there still remains a residual amount of a feedback component in the outputted signal from the subsystem 610. This is addressed by subsystem 620.

More specifically, as seen, the arrangement of subsystem 620 includes components that correspond to that of subsystem 610 (adder 622, filter 2 and adaptive algorithm 2). In this regard, in an exemplary embodiment, the concept and/or the functionality of subsystem 620 is duplicative of that detailed above with respect to subsystem 610, the differences being the input and the control signal from controller 566. Unlike subsystem 610, subsystem 620 receives the first stage cleaned microphone signal from subsystem 610, that signal being the "dirty" signal. The reference signal is the output from WDRC 555, and with respect to analogy to the adaptive noise cancellation system of FIG. 3B, this corresponds to the signal from exiting the adder 430. Subsystem 620 processes the output from the subsystem 610 utilizing adaptive filter 2, and provides the output from adaptive filter 2 to the adder 622, which is subtracted from the output of subsystem 610. As seen, adaptive algorithm 2 also receives the output from adaptive subsystem 610, and receives the output from the adder 622, and the adaptive algorithm 2 utilizes this input to control filter 2 and otherwise adaptive filter 2. The output from adder 622, and thus the output from adaptive subsystem 620, is provided to the WDRC 555 in some embodiments where present, and in other embodiments provided to the output device 434 and/or an intervening sound processor present, the output of which can be then provided to the output device 434.

In an exemplary embodiment shown in FIG. 6, subsystem 620 cancels the residual feedback component/unwanted signal, from the cleaned microphone signal/signal based on the microphone signal. In this exemplary embodiment, the residual acoustic feedback cancelation portion of the noise cancellation system is executed utilizing input that has been cleaned of body noise and a fair amount of the feedback noise component/utilizing input where the body noise and a fair amount of the feedback noise component has been canceled therefrom. This is different from the embodiment of FIG. 3B. In that embodiment, the input signals into the subsystem that are primarily utilized to remove body noise include at least some feedback components/signals that are not cleaned of feedback components/have not had the feedback components canceled therefrom.

Accordingly, it can be seen that there are two separate cancelers that are respectively utilized to cancel portions of the signals, and the cancelers are arranged in a serial manner. Put another way, in an exemplary embodiment includes a hearing prosthesis that includes a first and second canceler arranged in series. In an exemplary embodiment, the output of the first canceler is the input into the second canceler.

Accordingly, in an exemplary embodiment it can be seen that there is a combined body noise and initial feedback canceller, and one residual feedback canceler.

As noted above, the prosthesis system 600 includes a controller 666. In an exemplary embodiment, as noted above, this can be a chip or electronic circuitry having a logic arrangement (hardware, software, and/or firmware) that can evaluate output from the first and second and/or third subsystems and develop a control signal to control the sub processors of the first and second subsystems (610 and 620 respectively), such as by way of example only and not by way of limitation, controlling the adaptation time of the adaptive algorithms 1 and 2. In an exemplary embodiment, typically, the subsystem 620 is a cancellation system that is fast in adaptation relative to the adaptation of the subsystem 610. In an exemplary embodiment, this can accommodate fast-changing feedback paths. In the embodiment present, the body noise canceler/subsystem 610 has a slower adaptation speed/attack speed than the subsystem 620.

In an exemplary embodiment, subsystems 620 has an adaptation speed that is equal to or greater than or at least equal to 0.5, 0.75, 1, 1.25, 1.5, 2, 2.5, 3, 3.5, 4, 4.5, 5, 6, 7, 8, 9, 10, 11, 12, 13, 14, 15, 16, 17, 18, 19, 20, 25, 30, 35, 40, 45, 50, 60, 70, 80, 90, or 100 or more, or any value or range of values therebetween in 0.1 increments (e.g., 7.3, 45.9, 8.4 to 22.22) times that of subsystem 610, and the system is configured to enable such and the controller is configured to control the adaptations of subsystem 610 and/or 620 to have such and the controller is configured to adjust the adaptation speeds to have these features in at least some embodiments.

Further, in an exemplary embodiment, the prosthesis is configured such that subsystem 610 can adapt when (in some embodiments, only when) the controller 666 or other logic system of the prosthesis recognizes a scenario where there is no ambient noise present or otherwise minimal ambient noise present and/or where there is only body noise that is present (and thus embodiments include systems that enable the recognition of such). In this exemplary embodiment, this can be done to avoid adapting and then canceling external sounds.

Further, in an exemplary embodiment, the prosthesis system is configured such that adaptation of subsystem 620 is halted (or can be halted—the system can be configured to control the halting of such) or otherwise prevented (or can be prevented, again the system can be configured to control the preventing of such) while subsystem 610 adapts and/or vice versa.

Thus, in an exemplary embodiment, there is a system for reducing noise in a drive signal of a hearing device, such as a hearing prosthesis or a telephone receiver, etc., comprising a microphone (e.g., microphone 412) operative to receive sound and generate a microphone output signal. The system further includes an adaptive filter apparatus that receives a signal from a transducer separate from the microphone and outputs a filtered signal. The separate transducer can be an accelerometer operative to receive energy and generate an accelerometer output signal, the energy being energy also received at least in part by the microphone and transduced at least in part by the microphone into the microphone output signal. In this exemplary embodiment, the system subtracts (with the adder 612) the outputted filtered signal from a signal based on the microphone output signal to cancel noise and outputs the resulting signal (the output of adder 612), and the system further processes the resulting signal (output of adder 612) to obtain a further processed resulting signal (output of adder 622) to remove and/or eliminate residual feedback present in the resulting signal. In an exemplary embodiment, the system includes a second adaptive filter apparatus that processes the resulting signal to remove and/or eliminate residual feedback.

In an exemplary embodiment, the first subsystem 610 removes at least or an amount equal to or no more than 50, 55, 60, 65, 70, 75, 80, 85, 90, 91, 92, 93, 94, 95, 96, 97, or 98% or more, or any value or range of values therebetween in 0.1% increments of the total amount of feedback energy in the signal from the microphone, and the second subsystem 620 removes at least or an amount equal to or no more than 35, 40, 45, 50, 55, 60, 65, 70, 75, 80, 85, 90, 91, 92, 93, 94, 95, 96, 97 or 98, 99, or 100%, or any value or range of values therebetween in 0.1% increments of the residual feedback in the signal provided to the second subsystem 620. In an exemplary embodiment, the amounts removed can vary depending on frequency band. For example, more may be removed at frequencies below/at 1, 1.5, 2, 2.5, 3, 3.5 or 4 kHz or any value or range of values therebetween in 1 Hz increments than above (e.g., less than equal to 60, 65, 70, 75, 80, 85, 90 or 95% or any value or range of values in 1% increments below/at those values and greater than those numbers above), or vis-a-versa. This variation can be across multiple frequency bands (e.g., a certain amount below 2 kHz, another different amount from 2 to 3 kHz, and a different amount (at least from the another different amount) for frequencies above 3 kHz.

In an exemplary embodiment, the system includes a controller, such as controller 666, and the controller receives respective inputs based on signals including the resulting signal, the further processed resulting signal and the signal from the transducer separate from the microphone, and the controller controls the adaptive filter apparatus and the further processing of the resulting signal based on the respective inputs received by the controller.

With respect to embodiments that include a second adaptive filter, the second adaptive filter receives inputs based on signals including: (i) the resulting signal and (ii) the further processed resulting signal and/or a further processed further processed resulting signal (i.e., the further processed resulting signal is further processed, hence the double "further processed") and subtracts "ii" from "i" to result in the further processed resulting signal.

In some embodiments, the system is configured to separately control adaptation times of the adaptive filter and the second adaptive filter, and in some embodiments, the system includes a wide dynamic range compressor that receives output from the second adaptive filter and processes the further processed resulting signal and outputs the further processed further processed resulting signal. Further, in some embodiments, the adaptive filter cancels body conducted feedback and body noise and the residual feedback is acoustic feedback (more on this below).

In at least some of the embodiments of the arrangements of FIGS. 5 and 6, the embodiments improve upon the cancellation of feedback and body noises in at least implanted systems relative to that which is the case with the arrangement of FIG. 3B. By doing this, embodiments can enable an increase in a maximum stable gain of the system, relative to that which would be the case with the embodiment of FIG. 3B, allowing the hearing prosthesis to deliver additional gain with equal amounts of feedback, again relative to the arrangement of FIG. 3B. This can result in an extension of the treatment to patients who have higher hearing losses than that which is the case with the arrangement of FIG. 3B.

As seen above, in at least some exemplary embodiments, there are noise cancellation systems and/or entire hearing prosthesis systems that have two and only two or three and only three adaptive filters. These noise cancellation systems can be utilized in totally implantable hearing prostheses. In this regard, it is noted that in some exemplary embodiments, systems 500 and 600 corresponds to totally implantable hearing prosthesis systems.

It is noted that the feedback can include two types of feedback: atmospheric feedback and body conducted feedback. With respect to the former, this can correspond to an acoustic signal traveling from the receiver through the air to the microphone. In some embodiments, this corresponds to the residual feedback (see the embodiment of FIG. 6). In at least some exemplary embodiments, the accelerometer is effectively isolated from such feedback. In some other embodiments, this is not necessarily the case. In an exemplary embodiment, the amount of energy that is received via atmospheric feedback by the microphone is at least or equal to 2, 3, 4, 5, 6, 7, 8, 9, 10, 15, 20, 25, 30, 35, 40, 45 or 50 or more times or any value or range of values therebetween in 0.1 increments of the amount of energy associated with atmospheric feedback that is received by the accelerometer. While the just described example relates to a receiver that is outside the recipient, in an alternate embodiment, the output that generates the atmospheric feedback can be a vibrator of a passive transcutaneous bone conduction device and/or a vibrator of a percutaneous bone conduction device. Further, in an exemplary embodiment, the output that generates the atmospheric feedback could also be an implanted actuator, such as an implanted vibrator of an active transcutaneous bone conduction device or a middle-ear implant actuator, etc. Here, the feedback can travel through the tympanic membrane into the atmosphere and or/travel from the surface of other portions of the skin of the head (e.g., the skin over the vibrator of an active trend continues bone conduction device) into the atmosphere for that matter.

Conversely, in at least some exemplary embodiments, the body conducted feedback travels through the body to the microphone and also to the actuator. In this regard, in an exemplary embodiment, the amount of energy associated with body conducted feedback that is received by the microphone is substantially the same as that received by the accelerometer. In an exemplary embodiment, the amount of energy that is received via body conducted feedback by the microphone is at least or equal to or no more than about 0.8, 0.85, 0.9, 0.91, 0.92, 0.93, 0.94, 0.95, 0.96, 0.97, 0.98, 0.99, 1.0, 1.01, 1.02, 1.03, 1.04, 1.05, 1.06, 47, 48, 1.09, 1.1, 1.15 or 1.2 or any value or range of values therebetween in 0.01 increments times the amount of energy received by the accelerometer all things being equal. Accordingly, in at least some exemplary embodiments, there can be utilitarian value with respect to regulating the adaptation time associated with the body noise canceler depending on whether or not there is ambient sound. If indeed there is ambient sound, there is thus a scenario where there is likely to be more body conducted feedback than that which would otherwise be the case, and thus the accelerometer would be prone to such in at least some exemplary embodiments, and therefore it would be utilitarian to have a fast adaptation time. Conversely, during periods of silence, there is likely only to be body conducted noise as opposed to the feedback kind, and therefore, a lower adaptation speed can be utilitarian with respect to avoiding clicking or other artifacts that are not wanted.

As can be seen with respect to the embodiment of FIG. 5, embodiments can entail the separation of cancellation of respect to feedback contents from the microphone and the accelerometer before combining the signals (or, more accurately, subtracting the accelerometer signal from the microphone signal). In this regard, in an exemplary embodiment, the embodiment of FIG. 5 can be explained as the utilization of a cleaner accelerometer signal relative to that which is the case with respect to the arrangement of FIG. 3B when the accelerometer signal is ultimately subtracted from the microphone signal. Further in this regard, in an exemplary embodiment, the embodiment of FIG. 5 can be further explained as utilization of a cleaner microphone signal relative to that which is the case with respect to the arrangement of FIG. 3B when the accelerometer signal is ultimately subtracted from the microphone signal. It is noted that the subtraction of the accelerometer signal from the microphone signal can be generally classified as the cancellation of body conducted noise from the microphone signal.

It is noted that the embodiment of FIG. 5 has the feedback cancellation portions present before the body noise cancellation portion. In an alternate embodiment, the body noise cancellation portion is present before the feedback cancellation portion. That is, while in some embodiments, the feedback cancellation portion occurs upstream of the body noise cancellation portion, in an alternate embodiment, the body noise cancellation portion is upstream of the feedback cancellation portion.

Still, as seen above, in at least some exemplary embodiments, the body conducted noise is first removed from the microphone signal, followed by residual feedback removal.

Figure 7:
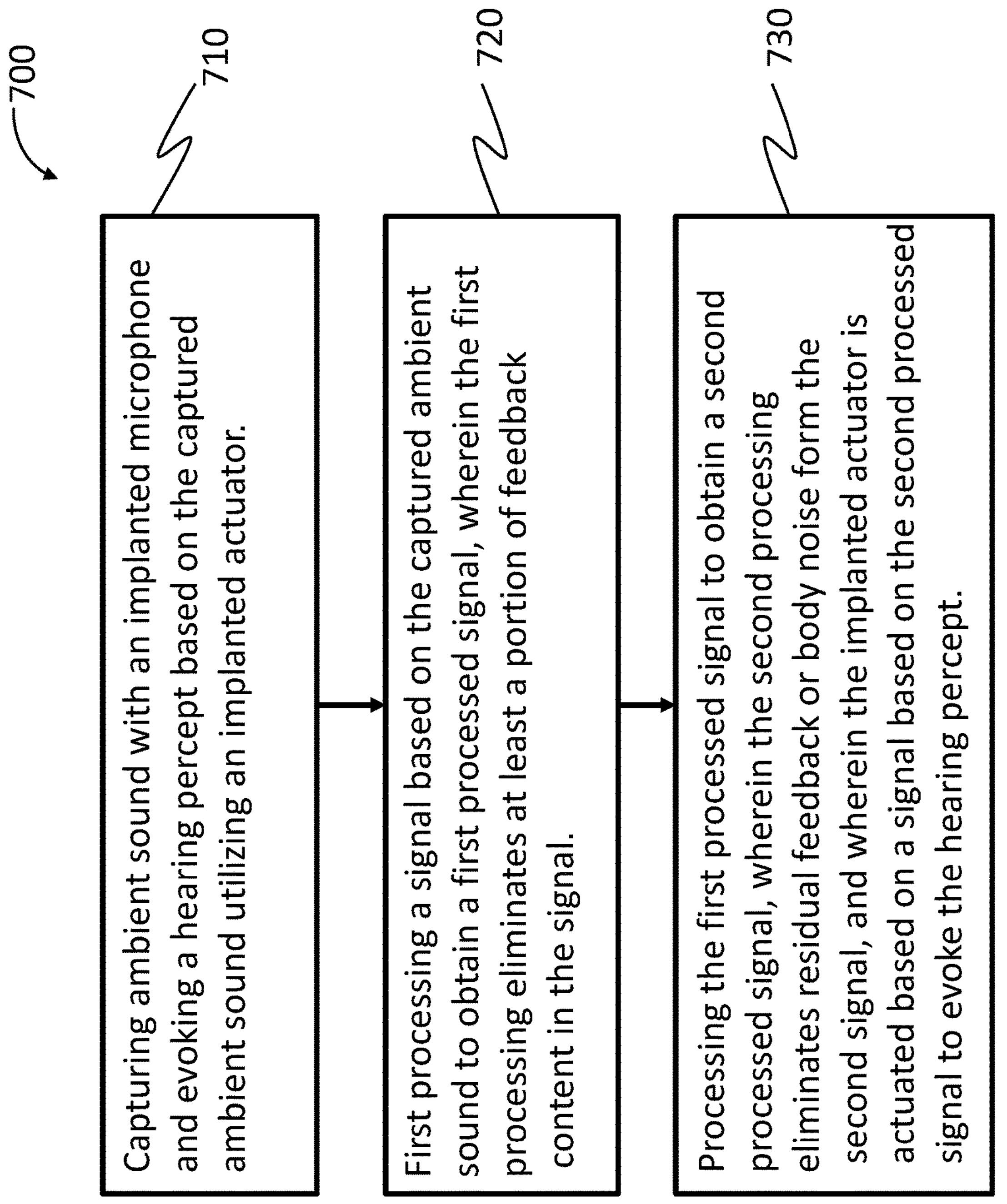
FIG. 7 presents a flow chart of an exemplary embodiment of the invention.

FIG. 7 presents an exemplary flowchart for an exemplary method 700 which can be executed by and/or in a totally implantable hearing prosthesis. Method 700 includes method action 710, which includes capturing ambient sound with an implanted microphone implanted in a human recipient and evoking a hearing percept in the human recipient based on the captured ambient sound utilizing an implanted actuator, such as a vibrator. Method 700 further includes method action 710, which includes first processing a signal based on the captured ambient sound to obtain a first processed signal (e.g., the output of subsystem 510 or 610), wherein the first processing eliminates at least a portion of feedback content in the signal. The signal that is processed is, in some embodiments, the signal/is based on a signal outputted by the microphone. The method 700 further includes method action 730, which includes processing the first processed signal to obtain a second processed signal (e.g., the output of subsystem 530 or 620), wherein the second processing eliminates residual feedback or body noise from the second signal, and wherein the implanted actuator is actuated based on a signal (e.g., the output signal) based on the second processed signal to evoke the hearing percept. This is serial processing, as can be understood. It is noted that method 700 covers both the embodiments of FIG. 5 in FIG. 6. In this regard, the first processing of the signal can correspond to that which results from subsystem 510 and the second processing can result that which results from subsystem 530. The actions associated with the second processing can utilize the signal from the second subsystem 520 as seen in FIG. 5. That is, while the embodiment of method 700 includes serial processing, it does not exclude the parallel processing of the embodiment of FIG. 5. Method 700 also includes the embodiment of FIG. 6 of course.

In an exemplary embodiment, the first processing of method 700 eliminates feedback without eliminating a substantial amount of body noise present in the signal, concomitant with the embodiment of FIG. 5, and the second processing eliminates a substantial amount of body noise present in the first signal, again concomitant with the embodiment of FIG. 5.

In an exemplary embodiment, the first processing results in an amount at least or an amount equal to 50, 55, 60, 65, 70, 75, 80, 85, 90, 91, 92, 93, 94, 95, 96, 97, 98, 99, or 100% or any value, or range of values therebetween in 0.1% increments of the total amount of body noise energy in the signal from the microphone. The second processing removes at least or an amount equal to 35, 40, 45, 50, 55, 60, 65, 70, 75, 80, 85, 90, 91, 92, 93, 94, 95, 96, 97 or 98, 99, or 100%, or any value or range of values therebetween in 0.1% increments of the total amount of body noise energy in the signal from the microphone.

In an exemplary embodiment, the first processing eliminates feedback and a substantial amount of body noise present in the signal, and the second processing eliminates a substantial amount of residual feedback present in the first signal. This is the embodiment of FIG. 6.

Still further, in an exemplary embodiment, the first processing and the second processing is executed using adaptive filters and an implanted controller implanted in a recipient of the microphone controls adaptation of the filters of the second processing so that adaptation is halted when the microphone is capturing ambient sound. In an exemplary embodiment, the implanted controller implanted in the recipient controls adaptations of the filters of the first processing so that adaptation is halted when the microphone is not capturing ambient sound. In at least some exemplary embodiments, the first processing and the second processing is executed using respective adaptive filters that have respective adaptation times that are substantially different, while in other exemplary embodiments, the first processing and the second processing is executed utilizing respective adaptive filters that have respective adaptation times that are at least about the same as one another. As will be understood, in some embodiments, the method 700 is executed automatically by a totally implantable hearing prostheses, and the hearing prosthesis can include two or three noise cancellation subsystems. In an exemplary embodiment, only one of these receives a signal that corresponds to a raw output signal from the microphone. That is, in some embodiments, there are one or two subsystems that do not receive a signal that corresponds to a raw output signal from the microphone.

In some embodiments of the method 700, the first processing and the second processing is executed using respective noise cancellation subsystems, one of which is controlled at least in part by a signal based on a drive signal that is used to drive the actuator, and one of which is not controlled by the signal based on the drive signal, and in some embodiments of the method, the first processing and the second processing is executed using respective noise cancellation subsystems, and a single controller automatically controls the noise cancellation subsystems simultaneously.

In an exemplary embodiment, in an environment where there is no ambient sound, the accelerometer and the microphone output should be relatively the same. This can be a period where there is utilitarian value with respect to operating the body noise canceler and suspending operation or otherwise limiting operation, such as expanding the adaptation time of the adaptive filters, of the feedback cancellation subsystem. In this regard, embodiments include devices, systems, and methods that control the timing of adaptation. In an exemplary embodiment, the prosthesis can be configured to determine whether or not there exists the presence of body noise. The prosthesis can be configured to prevent adaptation or otherwise suspend adaptation or otherwise freeze the filters upon a determination that there is no body noise relatively low amounts of body noise. That said, in an exemplary embodiment, the hearing prosthesis can be configured to determine relative amounts of body noise that is present, and control the adaptation of the filters accordingly. By way of example only and not by way of limitation, the prosthesis can be configured to determine that there exist relatively high amounts of body noise, and thus implement a faster adaptation time for the adaptive filters relative to that which would exist if the prosthesis determined that relatively lower amounts of body noise were present, and so on. Corollary to this is that in an exemplary embodiment, the prosthesis can be configured to determine that relatively low amounts of body noise are present, and thus implement a slower adaptation time and/or suspend adaptation of the filters relative to that which would be the case if higher relative amounts of body noise are present. The reduction in adaptation speed/freezing the filters relating to the body noise canceler can have utilitarian value when there is no body noise or otherwise when there is little body noise because the canceler will attempt to cancel body noise even though none were little amount may be present. Thus, by suspending the cancellation, the likelihood that the system will overcompensate of like is reduced.

In an exemplary embodiment, the feedback cancellation is always activated. In an exemplary embodiment, the adaptive filters of the feedback cancelers are never frozen. In an exemplary embodiment, the adaptation speeds can be varied. That said, in an exemplary embodiment, there can be times when the feedback cancelers are also frozen as well.

Embodiments can include a prosthesis that is configured to determine whether or not the system is stable. Upon a determination that the system is stable, the one or more of the adaptive filters can be potentially frozen or otherwise the adaptation times of one or more of the adaptive filters can be reduced. In an exemplary embodiment, this is applicable to the filters of the body noise canceler. Indeed, with respect to the embodiment of FIG. 6, it is entirely possible that the first subsystem 610 could be in a situation where the filters are frozen or otherwise the adaptation times of the filters are reduced by a significant amount, such as in the case of minimal body noise (including no body noise). In such an eventuality, it would be left to the second subsystem 620 to eliminate the feedback. In this regard, the hearing prosthesis can determine that the system is stable with respect to body noise/the first subsystem is stable, and thus permit the second subsystem to adapt in a more aggressive manner, or otherwise permit the second subsystem to a adapt at all (as opposed to freezing the filters thereof).

It is briefly noted that the accelerometer signal is not as critical for the second subsystem 620 and the embodiment of FIG. 6. In an exemplary embodiment, the second subsystem can operate entirely without direct input from the accelerometer. Indeed, in an exemplary embodiment, the only influence that the accelerometer has won the operation of the second subsystem 620 is the fact that the input signal from the microphone has been cleaned based on the accelerometer signal.

Embodiments can include a noise cancellation system that is more sensitive to body noise cancellation than that which results from FIG. 3B. In this regard, in an exemplary embodiment, the arrangements of FIGS. 5 and/or 6 that is at least and/or equal to 30, 35, 40, 45, 50, 55, 60, 65, 70, 80, 90, 100, 125, 150, 175, 200, 225, 250, 275, 300, 350 or 400% or more or any value or range of values therebetween in 1% increments more sensitive to body noise than that of FIG. 3B. Embodiments that utilize the separate body noise cancellation, as opposed to the arrangement of FIG. 3B, result in superior performance compared to the utilization of the embodiment of FIG. 3B. By way of example only and not by way of limitation, at least and/or equal to 20, 25, 30, 35, 40, 45, 50, 55, 60, 65, 70, 80, 90, 100, 125, 150, 175, 200, 225, 250, 275, 300, 350 or 400% more body noise is canceled utilizing the arrangements of FIGS. 5 and/or 6 relative to that which be the case in the embodiment of FIG. 3B.

Thus, in an exemplary embodiment, we have separate body noise and acoustic feedback cancellation as compared to the embodiment of FIG. 3B, which combines the cancellation into a single cancellation regime.

In an exemplary embodiment, the control as detailed herein corresponds to processor apparatuses including a processor which processor of the processor apparatus can be a standard microprocessor supported by software or firmware or the like that is programmed to evaluate signals or other data received from or otherwise based on the sound capture device(s) and/or the other components of the systems detailed herein. By way of example only and not by way of limitation, in an exemplary embodiment, the microprocessor can have access to lookup tables or the like having data associated with features of a sound signal and/or a given accelerometer signal, by way of example, and can compare features of the input signal and compare those features to features in the lookup table, and, via related data in the lookup table associated with those features, make a determination about the input signal, and thus make a determination related to how given adaptive filters the like should be controlled.

It is noted that any method action detailed herein corresponds to a corresponding disclosure of a computer code for executing that method action, providing that the art enables such unless otherwise noted. In this regard, any method action detailed herein can be part of a non-transitory computer readable medium having recorded thereon, a computer program for executing at least a portion of a method, the computer program including code for executing that given method action.

With respect to computer programs, in some embodiments, there is a non-transitory computer-readable media having recorded thereon, a computer program for executing at least a portion of a method of executing the comparison action and/or evaluation actions detailed herein, if not more actions in some embodiments. The computer program including, for example, code for obtaining various inputs/data based on inputs, code for comparing and/or evaluating the inputs/data to each other and/or to a database of data, and code for controlling the filters/controlling the processing of the signals based on the comparison/evaluation.

Consistent with the teachings detailed herein, where any one or more of the method actions detailed herein can be executed in an automated fashion unless otherwise specified, such as being executed automatically under the control of a controller as detailed herein, such as for example, a microprocessor and/or a computer chip and/or circuitry having a logic configured to execute the automated function.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

Any action disclosed herein that is executed by the prostheses can be executed by a remote device (e.g., a smart phone, or a personal assistant device that is in signal communication with the hearing prostheses) and/or another component of any system detailed herein in an alternative embodiment, unless otherwise noted or unless the art does not enable such. Thus, any functionality of the prosthesis can be present in the remote device and/or another component of any system in an alternative embodiment. Thus, any disclosure of a functionality of the prosthesis corresponds to structure of the remote device and/or the another component of any system detailed herein that is configured to execute that functionality or otherwise have a functionality or otherwise to execute that method action.

It is further noted that any disclosure of a device and/or system detailed herein also corresponds to a disclosure of otherwise providing that device and/or system.

It is also noted that any disclosure herein of any process of manufacturing other providing a device corresponds to a device and/or system that results therefrom. It is also noted that any disclosure herein of any device and/or system corresponds to a disclosure of a method of producing or otherwise providing or otherwise making such.

Any embodiment or any feature disclosed herein can be combined with any one or more or other embodiments and/or other features disclosed herein, unless explicitly indicated and/or unless the art does not enable such. Any embodiment or any feature disclosed herein can be explicitly excluded from use with any one or more other embodiments and/or other features disclosed herein, unless explicitly indicated that such is combined and/or unless the art does not enable such exclusion.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A system for reducing noise in a drive signal of a hearing device, comprising:

a microphone operative to receive sound and generate a microphone output signal; and an adaptive filter apparatus that receives a signal from a transducer separate from the microphone and outputs a filtered signal, wherein the system subtracts the outputted filtered signal from a signal based on the microphone output signal to cancel noise and outputs the resulting signal, and the system further processes the resulting signal to obtain a further processed resulting signal to remove and/or eliminate residual feedback present in the resulting signal.

2. The system of claim 1, wherein:

the system includes a second adaptive filter apparatus that processes the resulting signal to remove and/or eliminate residual feedback.

3. The system of claim 1, wherein:

the system includes a controller;

the controller receives respective inputs based on signals including the resulting signal, the further processed resulting signal and the signal from the transducer separate from the microphone; and the controller controls the adaptive filter apparatus and the further processing of the resulting signal based on the respective inputs received by the controller.

4. The system of claim 2, wherein:

the second adaptive filter receives inputs based on signals including: (i) the resulting signal and (ii) the further processed resulting signal and/or a further processed further processed resulting signal and subtracts "ii" from "i" to result in the further processed resulting signal.

5. The system of claim 4, wherein:

the system includes a wide dynamic range compressor that receives output from the second adaptive filter and processes the further processed resulting signal and outputs the further processed further processed resulting signal.

6. The system of claim 2, wherein:

the system is configured to separately control adaptation times of the adaptive filter and the second adaptive filter.

7. The system of claim 1, wherein:

the adaptive filter cancels body conducted feedback and body noise; and the residual feedback is acoustic feedback.

8. The system of claim 1, further comprising:

the transducer separate from the microphone, wherein the transducer separate from the microphone and the microphone are part of an implantable microphone assembly that is part of the system.

9. A system for reducing noise in a drive signal of a hearing device, comprising:

a microphone operative to receive sound and generate a microphone output signal; and an accelerometer operative to receive energy and generate an accelerometer output signal, the energy being energy also received at least in part by the microphone and transduced at least in part by the microphone into the microphone output signal, wherein the system is configured to cancel feedback from the microphone output signal and the accelerometer output signal and output respective cleaner signals, and the system is configured to combine the respective signals to a modified signal that is a result of subtraction of a signal based on the respective cleaner signal for the accelerometer from a signal based on the respective cleaner signal for the microphone.

10. The system of claim 9, wherein:

the system is configured to independently cancel feedback from the microphone output signal and independently cancel feedback from the accelerometer output signal and output respective cleaner signals from subsystem (s) of the system.

11. The system of claim 9, wherein:

the system includes a first noise cancellation subsystem that cancels the feedback from the microphone output signal and the accelerometer output signal;

the system includes a second noise cancellation subsystem that subtracts the signal based on the respective cleaner signal for the accelerometer from the signal based on the respective cleaner signal for the microphone; and the system is configured to enable the first noise cancellation subsystem to be substantially faster in adaptation relative to adaptation of the second noise cancellation subsystem.

12. The system of claim 9, wherein:

the system includes a first noise cancellation sub-system that cancels the feedback from the microphone output signal and the accelerometer output signal;

the system includes a second noise cancellation subsystem that subtracts the signal based on the respective cleaned signal for the accelerometer from the signal based on the respective cleaned signal for the microphone; and the system is configured to identify an occurrence where only body noises are captured by the microphone and/or the accelerometer and control the second subsystem to adapt during such occurrence.

13. The system of claim 9, wherein:

the system is configured to amplify the modified signal; and the system is configured to provide the amplified modified signal to a processor and/or to an output device of the system.

14. The system of claim 9, further comprising one of:

an implantable transducer configured to stimulate tissue of a recipient of the system based on the modified signal; or a bone conduction actuator configured to evoke a bone conduction hearing percept based on the modified signal.

15. The system of claim 9, wherein:

the outputted cleaner signal of the microphone output signal, prior to combination, includes a component of body noise, and the combination of the respective signals results in a signal that has less body noise relative to the outputted cleaner signal of the microphone output signal.

16. A method, comprising:

capturing ambient sound with an implanted microphone and evoking a hearing percept based on the captured ambient sound utilizing an implanted actuator;

first processing a signal based on the captured ambient sound to obtain a first processed signal, wherein the first processing eliminates at least a portion of feedback content in the signal;

and processing the first processed signal to obtain a second processed signal, wherein the second processing eliminates residual feedback or body noise from the second signal, and wherein the implanted actuator is actuated based on a signal based on the second processed signal to evoke the hearing percept.

17. The method of claim 16, wherein:

the first processing eliminates feedback without eliminating a substantial amount of body noise present in the signal; and the second processing eliminates a substantial amount of body noise present in the first signal.

18. The method of claim 16, wherein:

the first processing eliminates feedback and a substantial amount of body noise present in the signal; and the second processing eliminates a substantial amount of residual feedback present in the first signal.

19. The method of claim 16, wherein:

the first processing and the second processing is executed using adaptive filters; and an implanted controller implanted in a recipient of the microphone controls adaptation of the filters of the second processing so that adaptation is halted when the microphone is capturing ambient sound.

20. The method of claim 16, wherein:

the method is executed automatically by a totally implantable hearing prosthesis; and the hearing prosthesis includes three noise cancellation subsystems, only one of which receives a signal that corresponds to a raw output signal from the microphone.

21. The method of claim 16, wherein:

the first processing and the second processing is executed using respective noise cancellation subsystems, one of which is controlled at least in part by a signal based on a drive signal that is used to drive the actuator, and one of which is not controlled by the signal based on the drive signal.

22. The method of claim 16, wherein:

the first processing and the second processing is executed using respective noise cancellation subsystems, and a single controller automatically controls the noise cancellation subsystems simultaneously.

* * * * *